US011800855B2

(12) United States Patent
Koertge

(10) Patent No.: US 11,800,855 B2
(45) Date of Patent: Oct. 31, 2023

(54) LARGE ANIMAL LIFTING AND MOVING APPARATUS

(71) Applicant: Todd Koertge, Parkersburg, IL (US)

(72) Inventor: Todd Koertge, Parkersburg, IL (US)

( * ) Notice: Subject to any disclaimer, the term of this patent is extended or adjusted under 35 U.S.C. 154(b) by 248 days.

(21) Appl. No.: 17/116,779

(22) Filed: Dec. 9, 2020

(65) Prior Publication Data
US 2022/0174911 A1 Jun. 9, 2022

(51) Int. Cl.
*A01K 29/00* (2006.01)
*B66F 9/18* (2006.01)
*A61D 3/00* (2006.01)
*B66F 9/12* (2006.01)
*B66F 9/065* (2006.01)

(52) U.S. Cl.
CPC ............... *A01K 29/00* (2013.01); *A61D 3/00* (2013.01); *B66F 9/122* (2013.01); *B66F 9/18* (2013.01); *B66F 9/065* (2013.01)

(58) Field of Classification Search
CPC ................................... B66F 9/122; B66F 9/18
See application file for complete search history.

(56) References Cited

U.S. PATENT DOCUMENTS

| 3,314,561 | A | * | 4/1967 | Chaney | B66F 9/18 |
| | | | | | 414/661 |
| 4,280,784 | A | * | 7/1981 | Ramacciotti | B66F 9/18 |
| | | | | | 294/67.1 |
| 4,432,306 | A | | 2/1984 | Rossa | |
| 5,778,827 | A | | 7/1998 | Hansen | |
| 6,609,481 | B1 | * | 8/2003 | McCarty | A01K 15/00 |
| | | | | | 452/187 |
| 6,729,263 | B2 | | 5/2004 | Miale et al. | |
| 6,869,265 | B2 | | 3/2005 | Smith et al. | |
| 10,219,488 | B2 | | 3/2019 | Goetz | |
| 2013/0341124 | A1 | * | 12/2013 | Robinson | E02F 3/96 |
| | | | | | 175/122 |
| 2017/0369295 | A1 | * | 12/2017 | Tygard | B66C 1/44 |
| 2018/0009359 | A1 | * | 1/2018 | Garneau | B60P 3/06 |
| 2018/0126889 | A1 | * | 5/2018 | Bettcher, III | B60P 1/44 |
| 2022/0032833 | A1 | * | 2/2022 | Richardson | B60P 1/34 |

FOREIGN PATENT DOCUMENTS

AU 668992 B2 4/1994
WO WO-2010/063059 A1 6/2010

* cited by examiner

*Primary Examiner* — Brady W Frazier
*Assistant Examiner* — Shanna Danielle Glover
(74) *Attorney, Agent, or Firm* — Foley & Lardner LLP

(57) ABSTRACT

A large animal lifting and moving apparatus includes a frame having a front end and a rear end, the frame, a drive shaft rotatably coupled to the frame, a drive motor coupled to the frame and operatively coupled to the drive shaft; the drive motor selectively powered by a power source, and one or more roller chains coupled to the drive shaft. The frame is structured to support a large animal between the front end and the rear end and structured to be moved during operation of the large animal lifting and moving apparatus. When the drive motor is powered by the power source, the drive motor drives the drive shaft and the roller chains coupled to the drive shaft.

16 Claims, 18 Drawing Sheets

LARGE ANIMAL LIFTING AND MOVING APPARATUS

BACKGROUND

The present invention relates generally to the field of outdoor power equipment and devices that attach thereto. More specifically, the present invention relates to animal transportation devices and methods of lifting and moving animals in commercial settings such as farms.

Commonly, cows and other large animals that stand on hard surfaces for long periods of time can be knocked down by another large animal or be unable to stand due to a sickness. When the cows or other large animals fall on the hard surface, the animal can have a hard time standing back up as they can be both tired (and/or sick) and the hard surface can be slippery. To rectify the situation, an owner of the animal must transport the animal to a location with dry ground. With large animals, this can be challenging due to the size, weight, and temperament of the animal. While some solutions have been created to facilitate the movement and/or lifting of the large animal, they require two or more people due to the weight of lifting the large animal.

SUMMARY

At least one embodiment relates to a large animal lifting and moving apparatus including a frame having a front end and a rear end, the frame, a drive shaft rotatably coupled to the frame, a drive motor coupled to the frame and operatively coupled to the drive shaft; the drive motor selectively powered by a power source, and one or more roller chains coupled to the drive shaft. The frame is structured to support a large animal between the front end and the rear end and. structured to be moved during operation of the large animal lifting and moving apparatus. When the drive motor is powered by the power source, the drive motor drives the drive shaft and the roller chains coupled to the drive shaft.

Another embodiment relates to an attachment for outdoor power equipment including a frame having a front end and a rear end and including a quick-attach receiver proximate the rear end, a drive shaft rotatably couple to the frame, a drive motor coupled to the frame and operatively coupled to the drive shaft; the drive motor powered by the outdoor power equipment, and one or more roller chains coupled to the drive shaft. When the drive motor is powered by the outdoor power equipment, the drive motor drives the drive shaft and the roller chains coupled to the drive shaft.

Another embodiment relates to a method for lifting and moving a large animal including providing a frame having a left side and a right side, disposing a drive shaft between the left side and the right side of the frame; the drive shaft rotatable about a drive axis, providing a drive motor coupled to the frame and operatively coupled to the drive shaft; the drive motor selectively powered by a power source, disposing one or more roller chains about the drive shaft and at least part of the frame, disposing a strap around the large animal, attaching the strap to at least one of the roller chains, powering, by the power source, the drive motor.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring to the figures generally, the large animal lifting and moving apparatus described herein may be used in combination with various forms of outdoor power equipment including tractors, yard tractors, skid-steers, skid-loaders, front-end loaders, rear-end loaders, lawnmowers, automobiles including trucks, and other equipment that includes the components describe herein. Additionally, the drive system described herein may be any form of a drive system, including a hydrostatic drive system, an electric drive system, a mechanical drive system (e.g., a transmission, a winch drive system, a belt and pulley drive system), or other drive systems that transfer power to a drive shaft. Additionally, while the large animal lifting and moving apparatus is used in reference with large animals (e.g., cows, bison, horses, deer, elk, moose, buffalo, pigs, bears, ostriches, emus, crocodiles, dolphins, sharks, small whales, elephants, etc.) nothing precludes the large animal lifting and moving apparatus from being used with small and medium sized animals (e.g., dogs, cats, ferrets, rabbits, ducks, chinchillas, otters, hedgehogs, skunks, turkeys, etc.).

Figure 1:
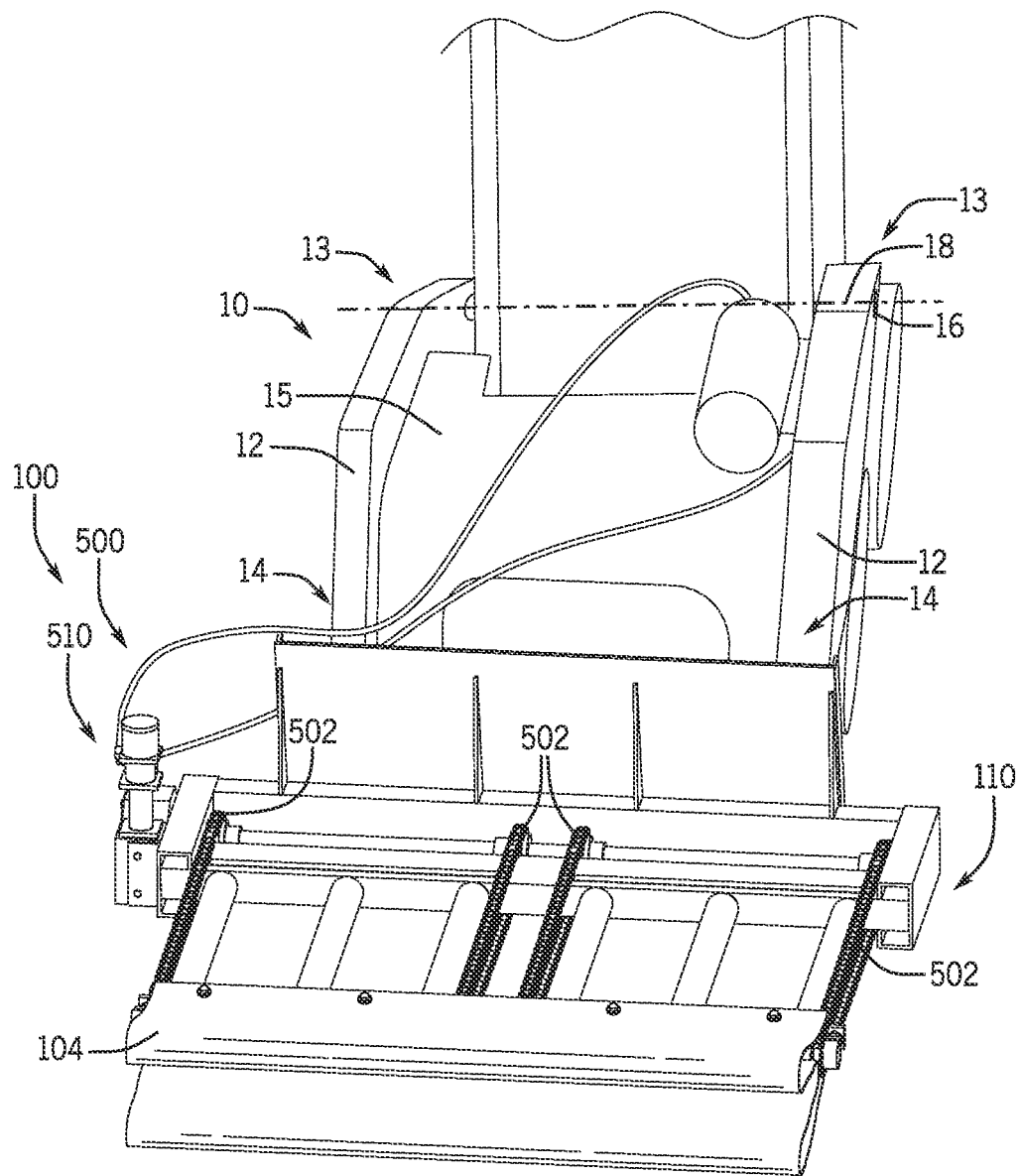
FIG. 1 is a perspective view of a large animal lifting and moving apparatus operatively coupled to a skid-steer, according to an exemplary embodiment.

Referring now to FIG. 1, the large animal lifting and moving apparatus 100 is shown, according to an exemplary embodiment. As shown, the large animal lifting and moving apparatus 100 includes a cover 104, one or more roller chains 502, a frame 110, and a drive system 500 including the roller chains 502 and a drive motor 510. Additionally, the large animal lifting and moving apparatus 100 is operatively and removably coupled to a skid-steer 10. In some embodiments, the large animal lifting and moving apparatus 100 is further fluidly, electrically, mechanically, and/or movably coupled to the skid-steer 10. The skid-steer 10 includes one or more lift aims 12 that are raised and lowered (e.g., rotate about a pivot point) through one or more actuators (not shown in FIG. 1). Each lift arm 12 includes a pivot attachment end 13 and an implement attachment end 14. The lift arms 12 are rotatably coupled to a body 15 of the skid-steer at a respective pivot point 16 proximate (i.e., near) the pivot attachment end 13, and the large animal lifting and moving apparatus 100 proximate (i.e., near) the implement attachment end 14. Each pivot point 16 is located along a pivot axis 18 along which the lift arms 12 and the large animal lifting and moving apparatus 100 rotate.

Figure 2:
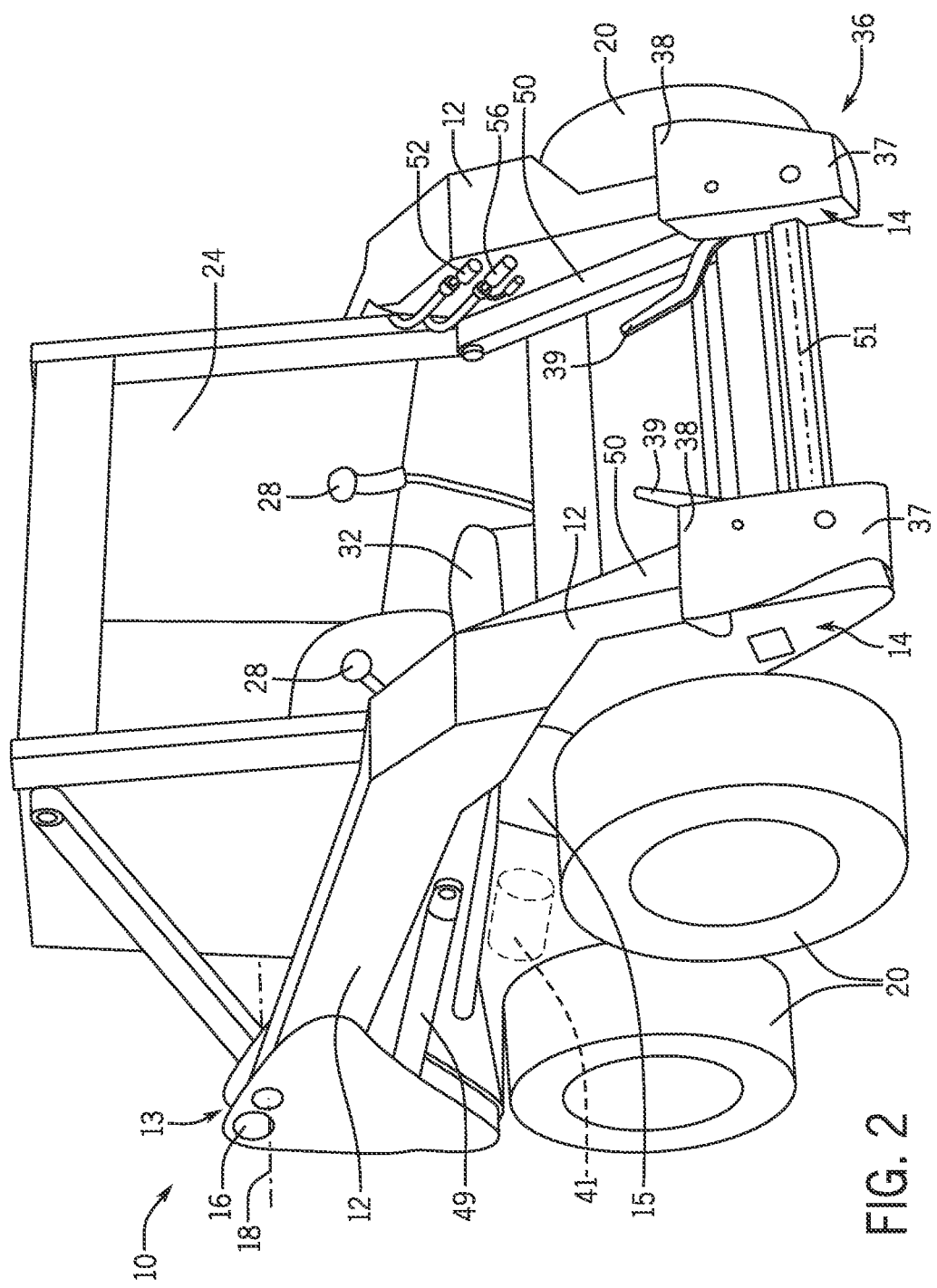
FIG. 2 is a perspective view of the skid-steer of FIG. 1.
Figure 3:
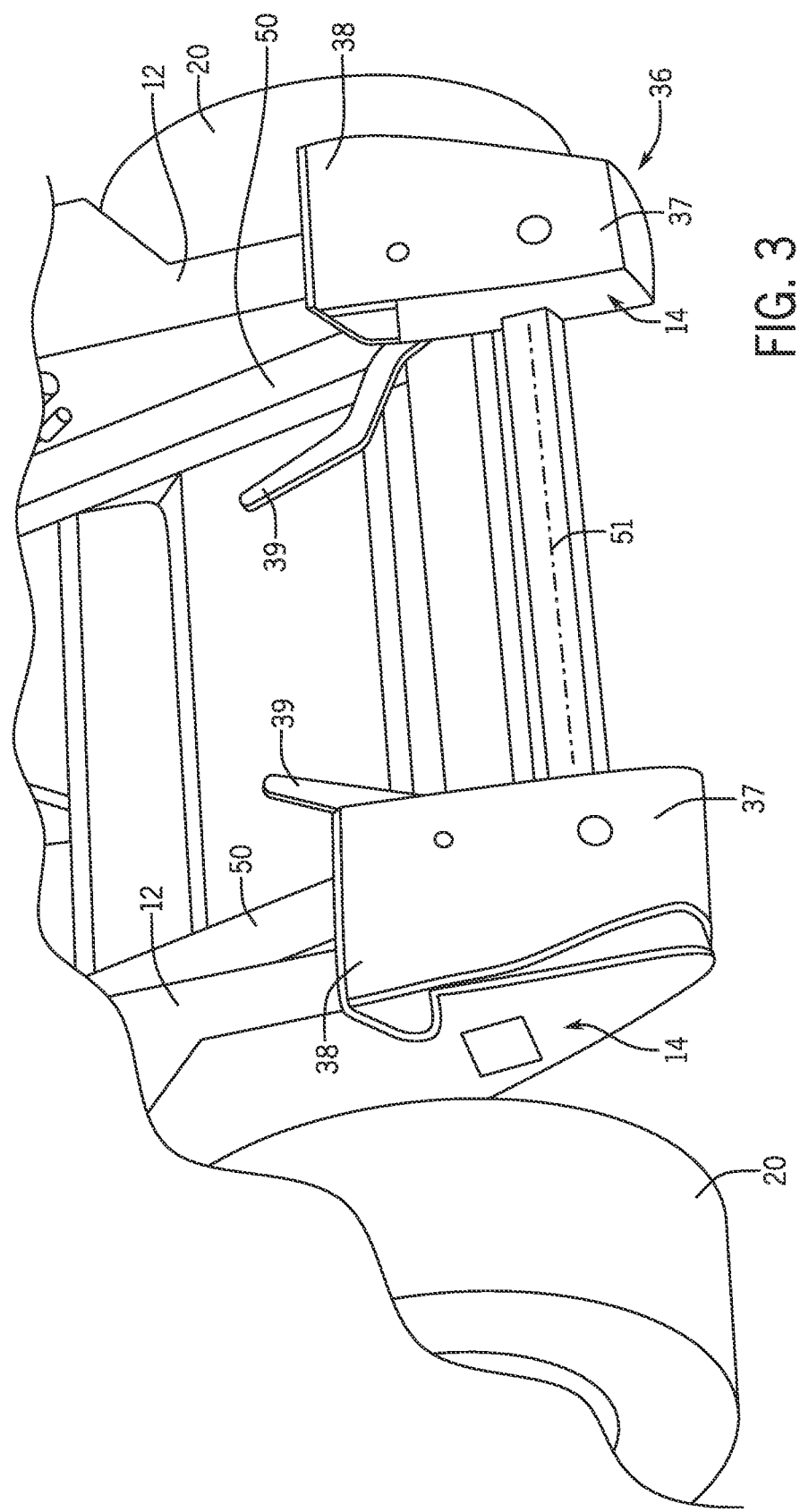
FIG. 3 is a perspective view of a quick-attach assembly of the skid-steer assembly of FIG. 1.
Figure 4:
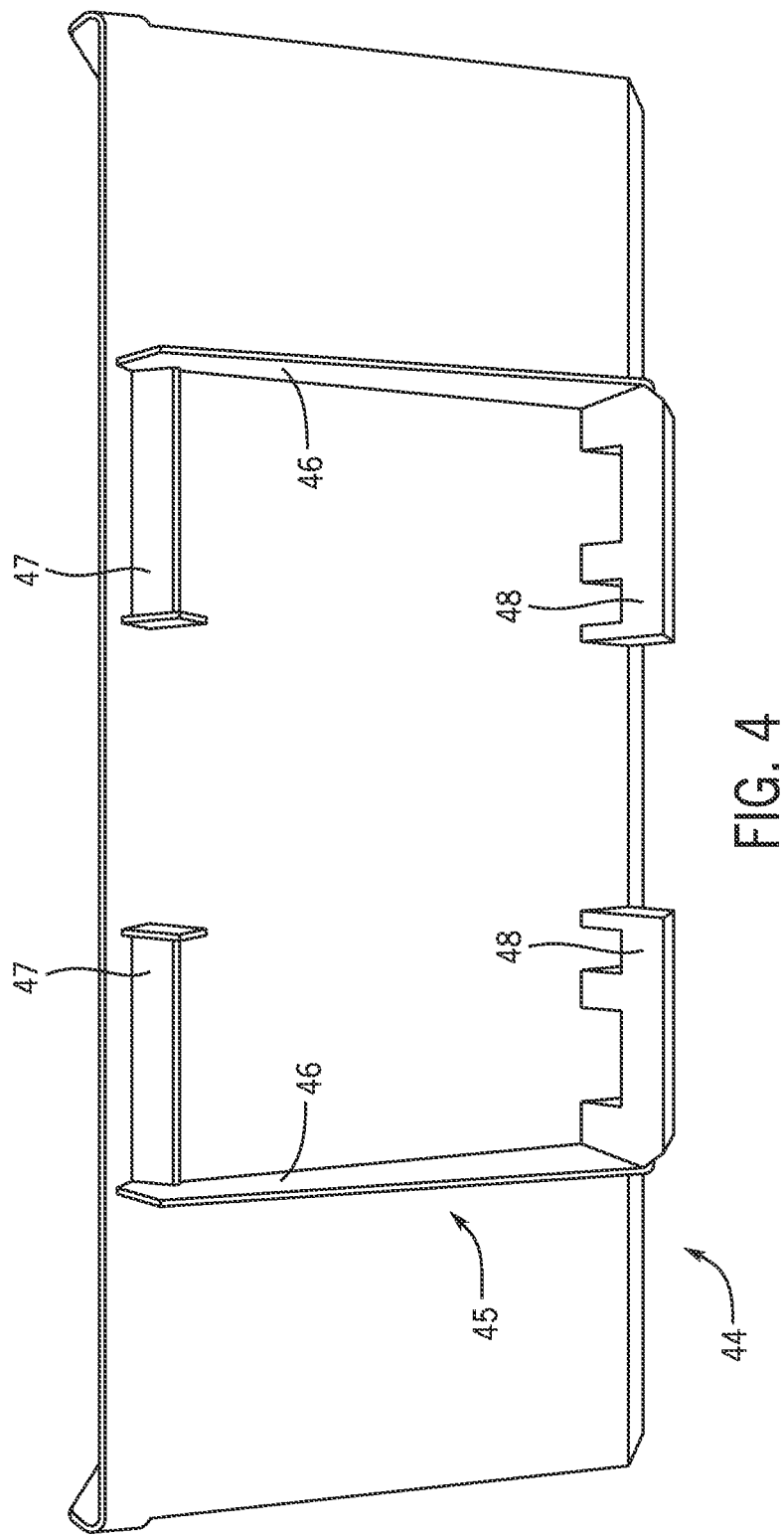
FIG. 4 is a rear perspective view of a bucket and a quick-attach receiver of the bucket, according to an exemplary embodiment.

Referring now to FIGS. 2-4, the skid-steer 10 is shown in more detail. The skid-steer further includes one or more drive wheels 20. As shown, the drive wheels 20 are coupled to the body 15 and an output shaft (not shown) through one or more lug-nuts/bolts. The drive wheels 20 are rotatable and drivable to allow for movement and rotation of the skid-steer 10. In one embodiment, each drive wheel 20 is independently controllable. In even other embodiments, the drive wheels 20 on each side of the body 15 are independently controllable. In this way, an operator of the skid-steer 10 can control each set of drive wheels 20 and operate the skid-steer 10 in a zero-turn fashion. For example, the operator of the skid-steer can rotate the skid-steer approximately 360 degrees without moving forward or backward (e.g., while staying in the same location). In some embodiments, the skid-steer does not include drive wheels 20 but rather includes tracks in place of the drive wheels 20. The tracks operate similar to the drive wheels 20, and may also be independently controllable. The drive wheels 20 are powered and driven through a prime mover 41 and a transmission 90, which will be described further herein.

The skid-steer 10 further includes a cab 24 extending vertically from the body 15, one or more user controls 28 located within the cab 24, and a seat 32. The cab 24 provides a cover and place of operation for the operator of the skid-steer 10. In some embodiments, the cab 24 further includes a door that is movable between an open position and a closed position. Within the cab 24 are the user controls 28 that allow the operator to control the skid-steer 10. The user controls 28 may be communicably and operatively coupled to the prime mover 41, the transmission 90, and/or a controller 91. In some embodiments, the user controls 28 communicate with the controller 91 and the controller operates and/or controls (e.g., through one or more control circuits) the prime mover 41 and the transmission 90. In this way, the user controls 28 are used to control various operations of the skid-steer 10 including movement of the skid-steer 10 through the drive wheels 20, rotation of the lift arms 12, and rotation of a quick-attach assembly 36. The seat 32 provides a location for the operator to sit while operating the skid-steer 10. In some embodiments, the operator may stand while operating the skid-steer 10 and the user controls 28 are foot pedals. While the user controls 28 are shown as hand controls, they may also be buttons, foot controls, and various other controls that control operation of the skid-steer 10 (e.g., an ignition switch).

Still referring to FIGS. 2-4, the quick-attach assembly 36 is shown. The quick-attach assembly 36 provisions the removable coupling between the lift arms 12 (at the implement attachment end 14) of the skid-steer 10 and a variety of different implements/apparatuses/attachments (all having the same receiver.) An example is shown in FIG. 4, i.e., a bucket 44. The quick-attach assembly 36 includes one or more locking mechanisms 39 (e.g., a handle selectively movable between a locked position and an unlocked position) and one or more brackets 37 having a pointed portion 38. In comparison, the quick-attach receiver 45 is shown with respect to the bucket 44. The quick-attach receiver 45 includes one or more protrusions 46, the protrusion having an angled portion 47 (i.e., a portion shaped to tightly receive the pointed portion 38) and a locking portion 48. In operation, the protrusions 46 receive the brackets 37 (and the angled portion 47 receives the pointed portion 38). Because of the shape of the angled portion 47 and the pointed portion 38, gravity will naturally keep both coupled together. Additionally, when the locking mechanism 39 is moved to the locked position, the locking portion 48 is coupled to the locking mechanism 39 (e.g., through a lock or removable fastener, etc.) and this prevents the quick-attach receiver 45 and the quick-attach assembly 36 from further decoupling. In some embodiments, the locking mechanism 39 may be operated through an electric actuator communicably coupled to the controller 91. In other embodiments, the locking mechanism 39 may be a pin that is received through one or more holes of the locking portion 48 to prevent the quick-attach assembly 36 and quick-attach receiver 45 from decoupling. In even other embodiments, the quick-attach assembly 36 is the European/global attachment mechanism that further includes a spring to help facilitate the coupling of the quick-attach assembly 36 and the quick-attach receiver 45. As a result, in this way, the quick-attach assembly 36 is removably coupled to the quick-attach receiver 45.

To then decouple the quick-attach receiver 45 and the quick-attach assembly 36, the operator/user moves the locking mechanisms 39 to the unlocked position. Once in the unlocked position, the locking mechanism 39 decouples from the locking portion 48, allowing the quick-attach assembly and the quick-attach receiver 45 to decouple. However, at this point, gravity still keeps the quick-attach assembly 36 and the quick-attach receiver 45 couple through the pointed portion 38 and the angled portion 47. To further decouple both, the operator/user normally applies a vertical force (using the skid-steer 10) to decouple the quick-attach receiver 45 and the quick-attach assembly 36. In this way, the user/operator can quickly move between various different implements/apparatuses/attachments that are needed at that time.

Still referring to FIGS. 2-4, the skid-steer is further shown to include the prime mover 41, one or more arm actuators 49, and one or more implement actuators 50. The prime mover 41 may be any producer of power such as internal combustion engine, an electrical power system (e.g., a rechargeable battery comprising one or more cells), or a hybrid system (e.g., an internal combustion engine in combination with an electric power system). In one embodiment, the prime mover 41 is a diesel engine including all of the required components of a diesel engine (e.g., one or more pistons, one or more cylinders, a fuel mixing system, an air intake system, a fuel tank, a fuel filter, a starter, an exhaust, etc.). In another embodiment the prime mover 41 is a rechargeable battery that provides electrical power directly to one or more electric motors. The prime mover 41 is coupled to the transmission 90, communicably coupled to the controller 91, and provides power (directly or indirectly) to the arm actuators 49, the implement actuators 50, and the drive wheels 20.

Each arm actuator 49 is coupled to the body 15 at one end and the respective lift arm 12 (at about the middle) at another end and is operable to raise and lower the respective lift arm 12, the quick-attach assembly 36 and the implement coupled thereto. The lift arm actuators 49 provide a force to the respective lift arm 12 and cause it rotate about the pivot axis 18. In one embodiment, the lift arm actuators 49 are operable to raise the respective lift arm 12 between maximum height and a minimum height. As such, the lift arm actuators 49 may be any type of actuator or device that is capable of performing the desired function. For example, the lift arm actuators 49 may be hydraulic actuators, electrical linear actuators, high-force ball screw actuators, electrical winches including a cable, or a motor directly coupled to the lift arm 12 at the pivot axis 18. In one embodiment, the lift arm actuators 49 are hydraulic linear actuators including a hydraulic cylinder and operated using pressurized hydraulic fluid provided by a pump. In this way, each arm actuator 49 provides a large linear force to the lift arm 12 and rotates the lift arm 12 about the pivot axis 18. In some embodiments, the controller 91 controls operation of the lift arm actuators 49 in combination with the user controls 28 and only operates the lift arms actuators 49 in synchronization (e.g., at the same time, in the same direction, at the same speed). In this way, the lift arms 12 do not move in different directions or at different speed, preventing damage to the lift arms 12, the quick-attach assembly 36, and the implement coupled thereto.

The implement actuators 50 are similar to the arm actuators 49 and are coupled at a first end to the body 15 and at a second, opposite, end to the quick-attach assembly 36. In this way, the implement actuators 50 are operable to rotate the quick-attach assembly 36 and the implement/apparatus coupled thereto about a second pivot axis 51. The implement actuators 50 may be any type of actuator or device that is capable of performing the desired function. For example, the implement actuators 50 may be hydraulic actuators, electrical linear actuators, high-force ball screw actuators, electrical winches including a cable, or a motor directly coupled to the quick-attach assembly 36 at the second pivot axis 51. In one embodiment, the implement actuators 50 are hydraulic linear actuators including a hydraulic cylinder and operated using pressurized hydraulic fluid provided by a pump. Similar to the arm actuators 49, the implement actuators 50 may be operated by the controller 91 in combination with user controls 28 and only operate in synchronization. In this way, the arm actuators 49 control the raising and lowering of the lift arms 12, the quick connect assembly 36, and the implement/apparatus coupled thereto and the implement actuators 50 control the orientation relative to horizontal of the quick connect assembly 36 and the implement/apparatus coupled thereto.

Figure 5:
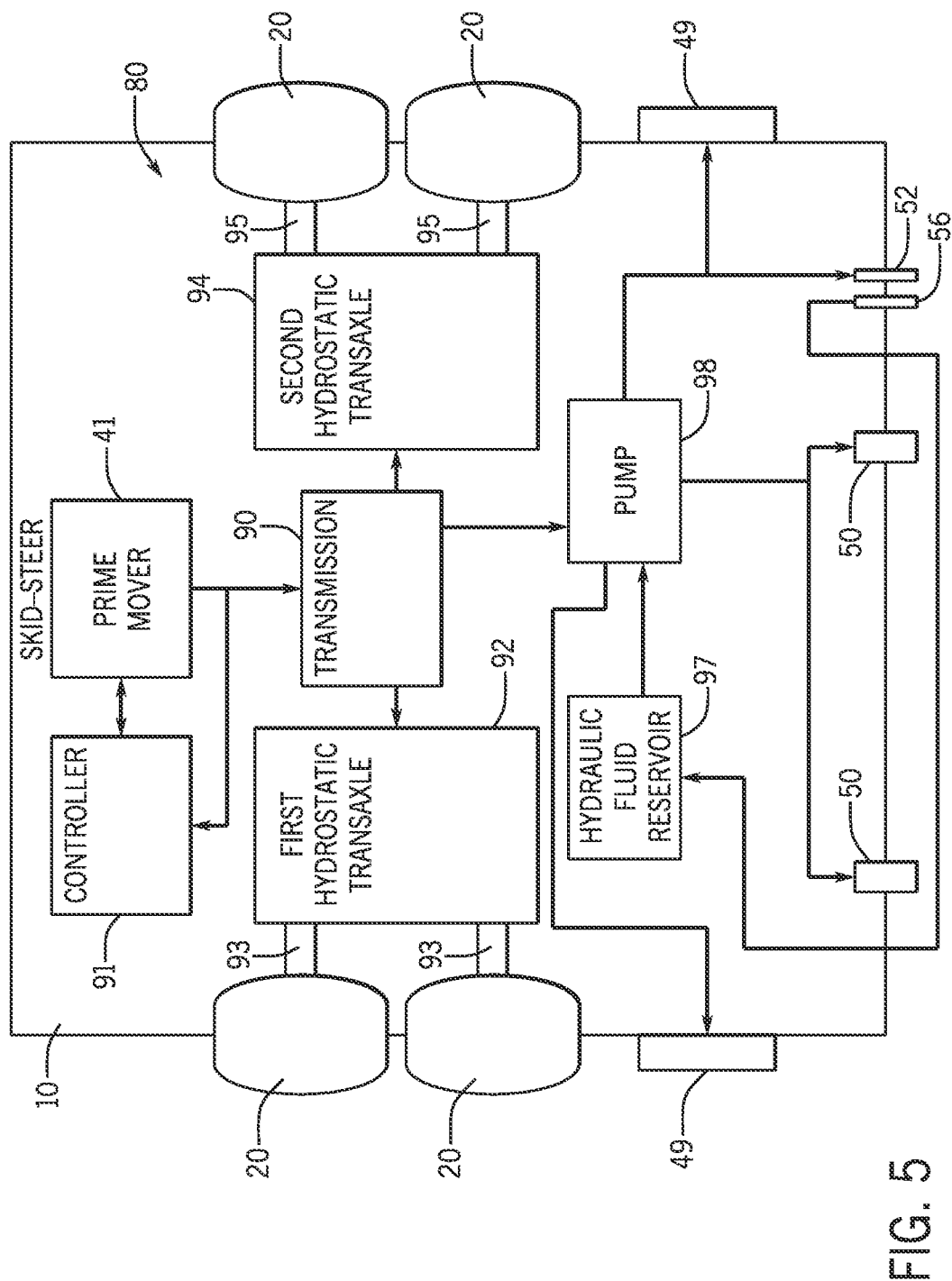
FIG. 5 is a block diagram of a hydraulic system of the skid-steer of FIG. 1, according to an exemplary embodiment.

Referring now to FIG. 5 and in-part FIG. 2, a hydraulic system 80 of the skid-steer 10 is shown, according to an exemplary embodiment. The hydraulic system 80 includes a first hydrostatic transaxle 92 and a second hydrostatic transaxle 94. Hydrostatic transaxles are common components that combine the hydraulic pump and hydraulic wheel motor into a single unit, thereby simplifying the overall cost of the drive system. In some embodiments, one or more hydraulic pumps and a hydraulic wheel motors may be used in lieu of the first hydrostatic transaxle 92 and the second hydrostatic transaxle 94. As shown, both the first hydrostatic transaxle 92 and the second hydrostatic transaxle 94 are coupled to and receive power from the transmission 90. The transmission 90 may be any kind of power transmitting device including a belt and pulley system, an automobile transmission, a gear assembly, etc. In this way, the transmission 90 receives torque from the prime mover 41 and provides it to the first hydrostatic transaxle 92, the second hydrostatic transaxle 94, and the pump 98. The first hydrostatic transaxle 92 includes one or more output shafts 93 that provide torque and rotation to at least one of the drive wheels 20. Additionally, the second hydrostatic transaxle includes one or more output shafts 95 that provide torque and rotation to at least one of the drive wheels 20. In this way and as explained earlier, the skid-steer 10 may move in a zero-turn fashion.

The hydraulic system 80 further includes a hydraulic fluid reservoir 97, the pump 98, the arm actuators 49, the implement actuators 50, an auxiliary hydraulic output 52, and an auxiliary hydraulic return 56. It should be understood that while the hydraulic system is shown to include a single pump 98 there may be one or more pumps 98. For example, in one embodiment, the hydraulic system 80 includes two or more pumps 98. The pump 98 receives power from the transmission 90 and hydraulic fluid from the hydraulic fluid reservoir 97. In this way, the pump 98 pressurizes the hydraulic fluid and selectively provides it to the arm actuators 49, the implement actuators 50, and the auxiliary hydraulic output 52 through one or more hydraulic connections (e.g., high pressure hoses, fittings, and/or lines). In even other embodiments, the pump 98 may be fluidly coupled to and provide pressurized hydraulic fluid to other components of the skid-steer. In some embodiments, the pump 98 is communicably and operatively coupled to the controller 91 and selectively provides the hydraulic fluid as decided by the controller 91. The pump 98 may be any type of pump including a variable-displacement pump, a rotary pump, a piston pump, etc.

The auxiliary hydraulic output 52 and the auxiliary hydraulic return 56 are a fluid coupling that fluidly couples whatever is received by the auxiliary hydraulic output 52 to the pump 98 to receive pressurized hydraulic fluid. For example, the auxiliary hydraulic output 52 may be fluidly coupled to an external hydraulic jackhammer (through one or more fittings and one or more hydraulic hoses). The external jackhammer may then receive pressurized hydraulic fluid from the pump 98 that allows the external jackhammer to operate. Once the pressurized hydraulic fluid is used by the external jackhammer, the hydraulic return 56 receives the used fluid (e.g., fluidly coupling the external jackhammer return line to the hydraulic fluid reservoir 97). In this way, external devices, apparatuses, and implements may receive power (in the form of pressurized hydraulic fluid) from the hydraulic system 80.

It should be understood that while the skid-steer 10 is shown to use a hydraulic system 80, many other configurations and methods of operations are possible. For example, in some embodiments, the skid-steer 10 may not include a transmission but instead includes one or more electrical connections, and one or more electrical drive motors that operate the drive wheels 20. In even other embodiments, the skid-steer may not include the auxiliary hydraulic output 52 and the auxiliary hydraulic return 56, but instead includes an auxiliary electrical output providing direct current (DC) power to various external components. In even other embodiments, the drive wheels 20 may be driven directly by the prime mover 41. Many various alternative, common, systems may be used in place of the hydraulic system 80 within the skid-steer 10. In even other embodiments, the various actuators (e.g., the arm actuators 49 and the implement actuators 50) are powered via electric power and not hydraulic power. In additional embodiments, the skid-steer 10 may include a power take off (PTO) shaft in place or in addition to the auxiliary hydraulic output 52 and the auxiliary hydraulic return 56. Power takes offs are well understood, but provide an output torque to which an external device may receive mechanical power in the form of torque.

Figure 6:
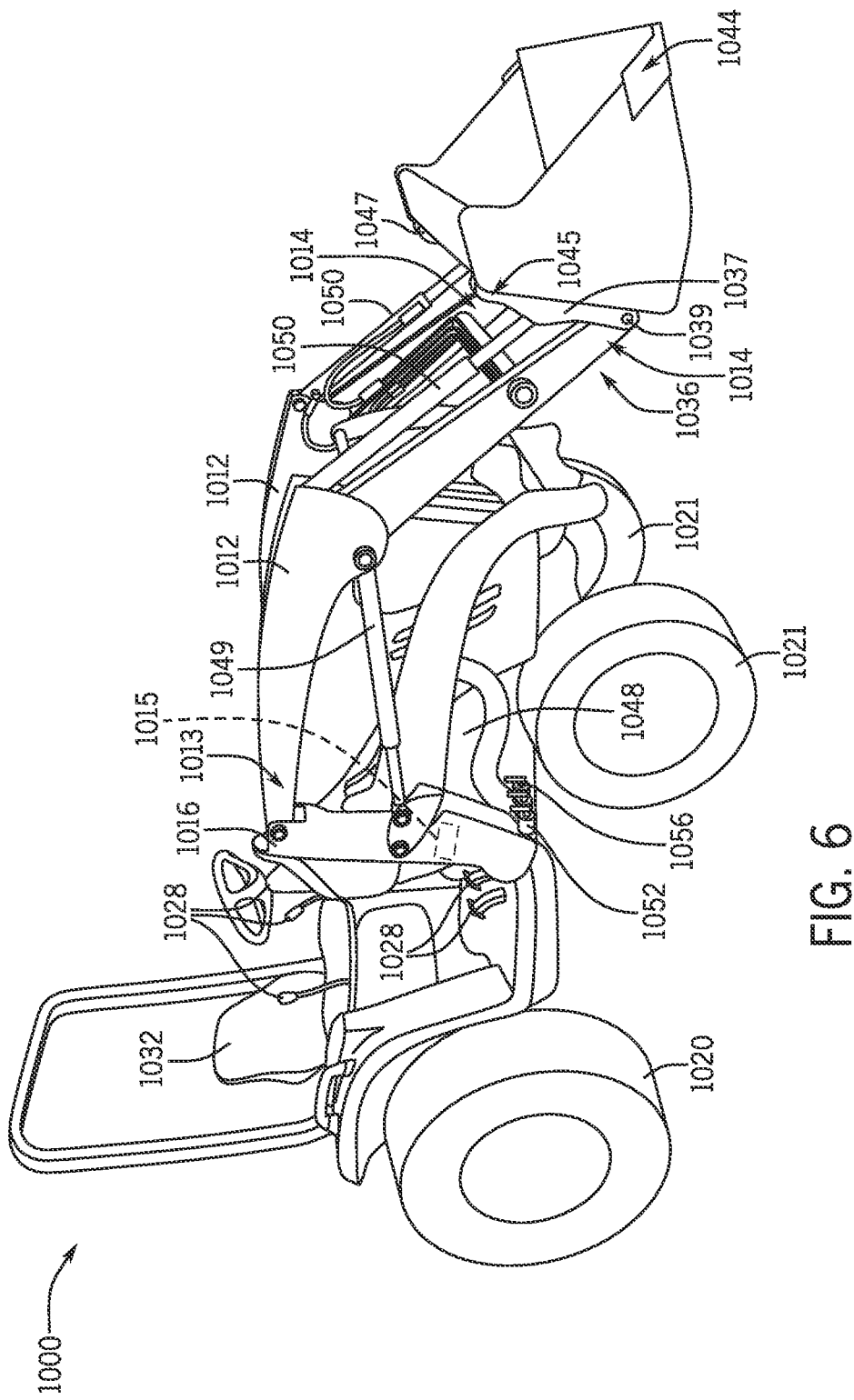
FIG. 6 is a perspective view of a lawn tractor, according to an example embodiment.
Figure 7:
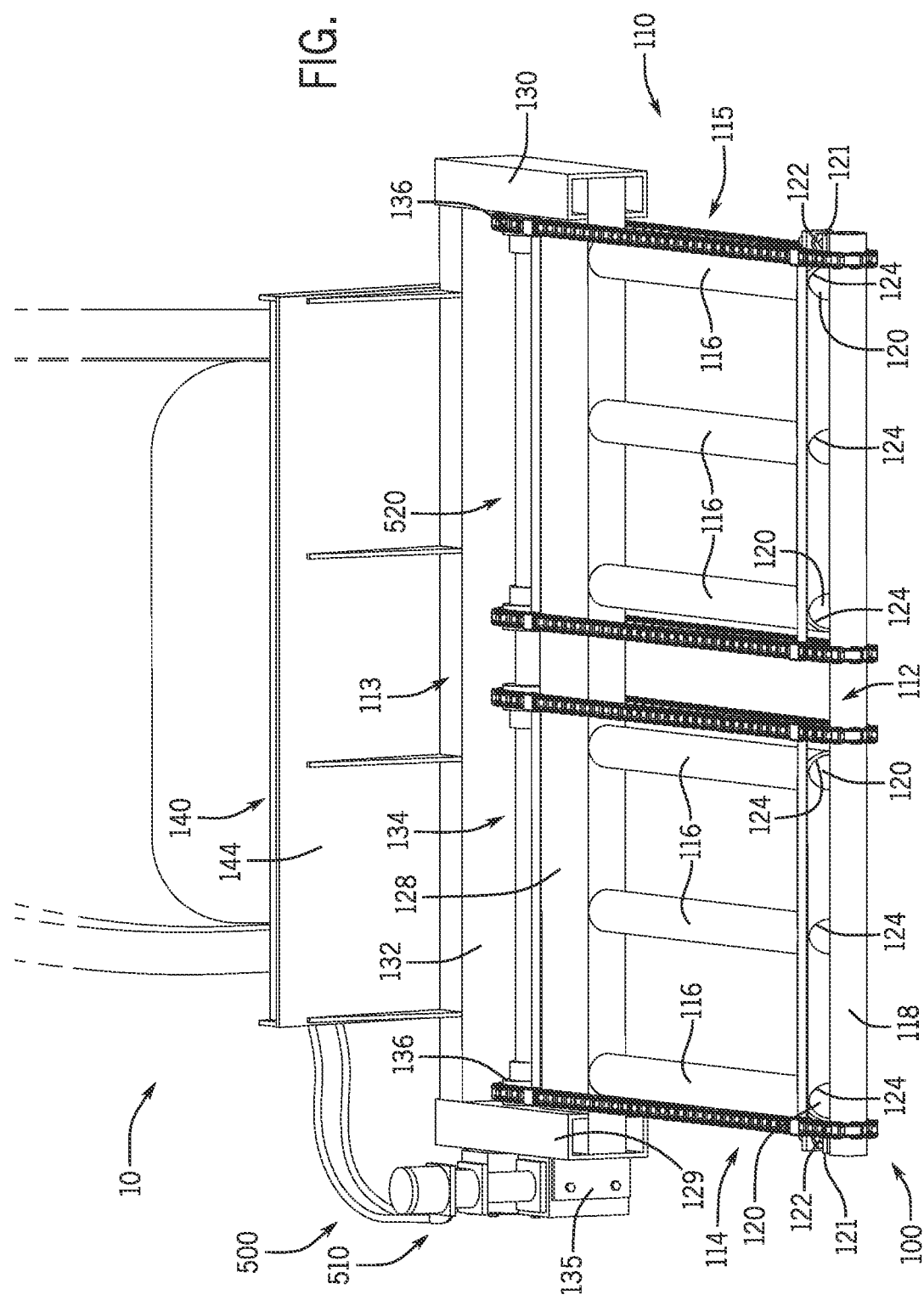
FIG. 7 is a front perspective view of a frame of the large animal lifting and moving apparatus of FIG. 1.
Figure 8:
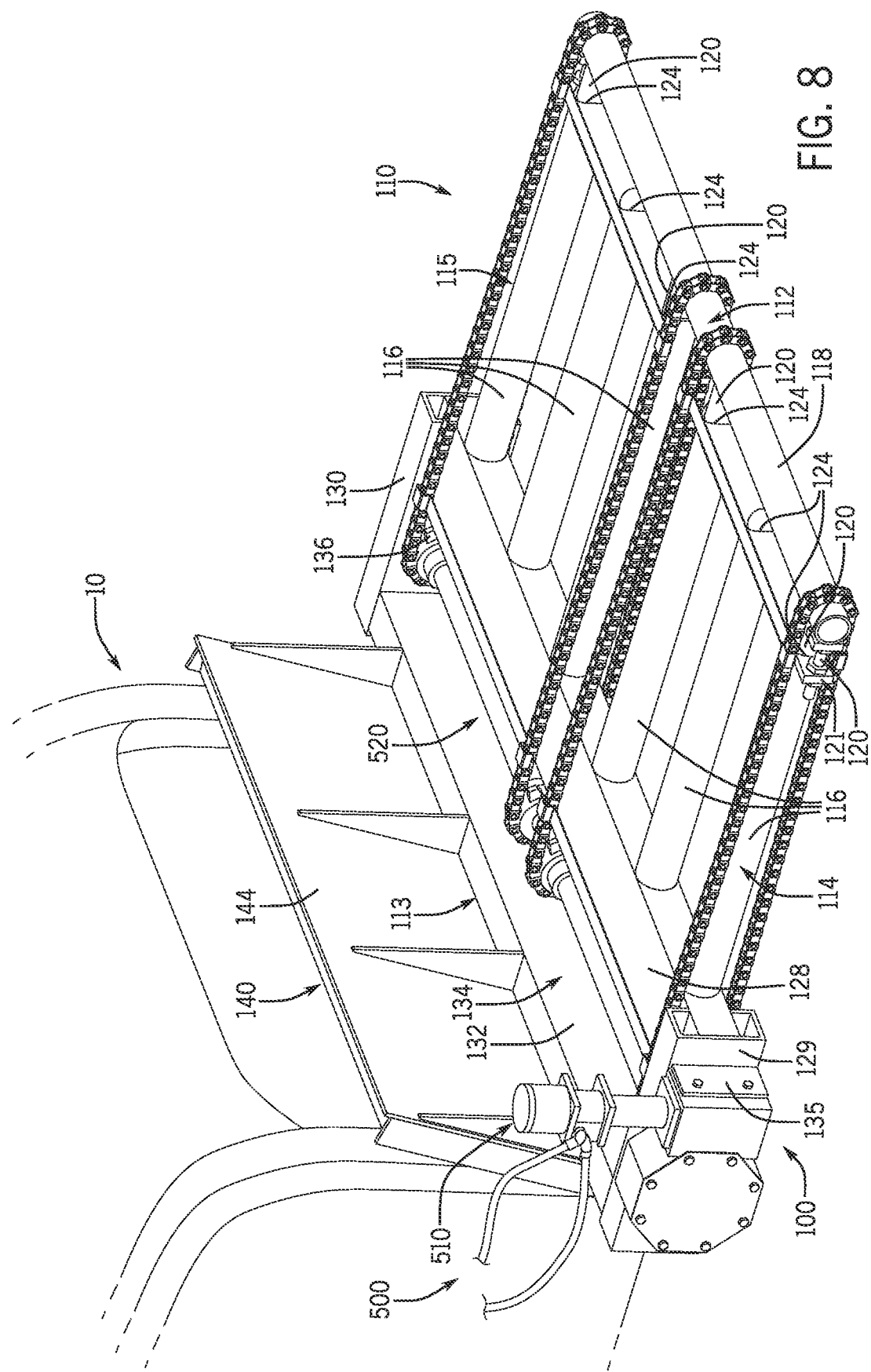
FIG. 8 is a side perspective view of the frame of FIG. 7, according to an exemplary embodiment.
Figure 9:
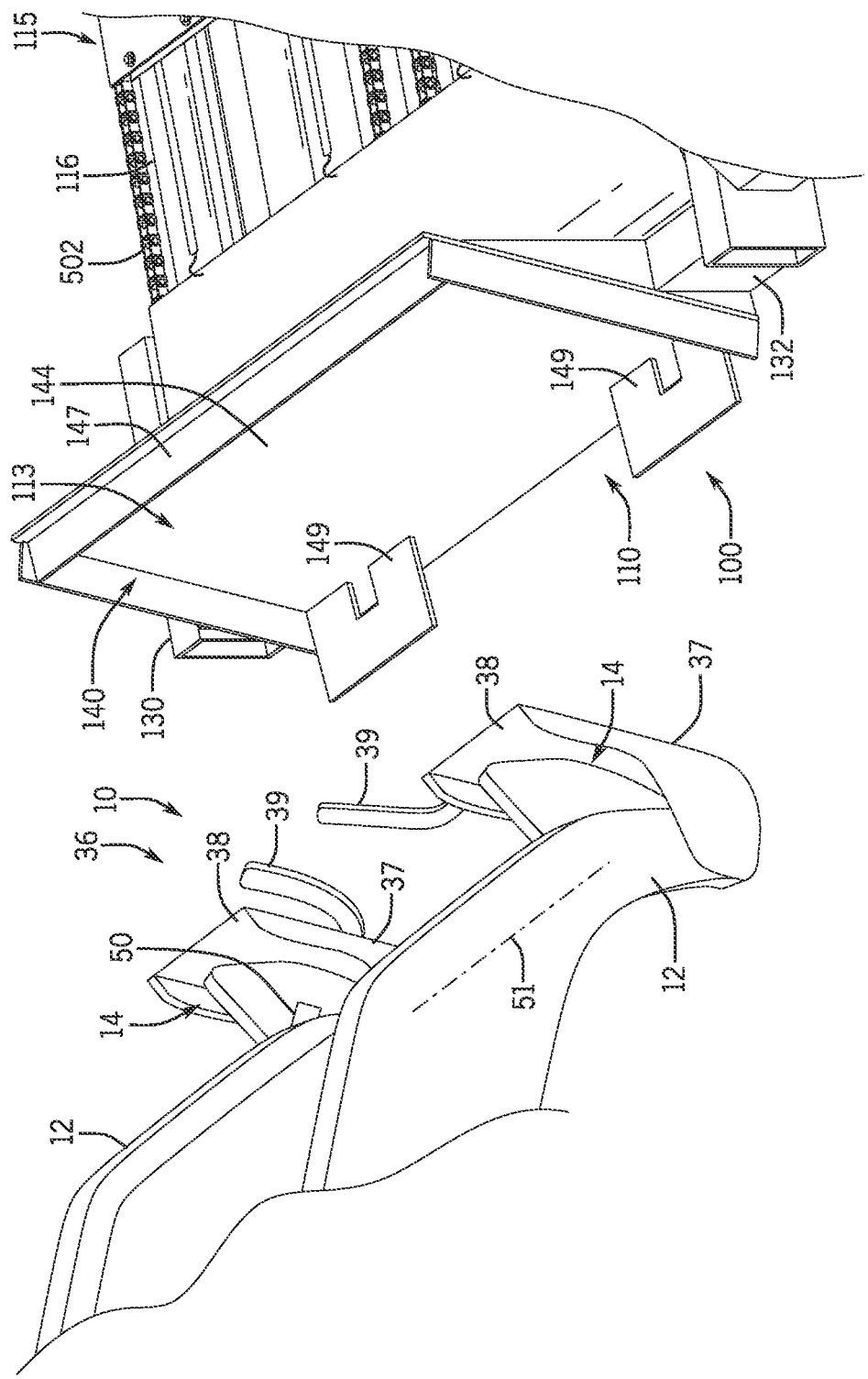
FIG. 9 is a perspective view of a quick-attach receiver of the frame of FIG. 7, according to an exemplary embodiment.

Referring now to FIG. 6, a lawn-tractor 1000 is shown according to an exemplary embodiment. The lawn-tractor 1000 is shown to demonstrate and emphasize that many various pieces of outdoor power equipment may be used in place of the skid-steer 10 to operate and work in tandem with the large animal lifting and moving apparatus 100. As a result, similar reference numbers (in comparison to the skid-steer 10) are used. As shown, various pieces of outdoor power equipment may vary slightly from the skid-steer 10. For example, the lawn-tractor 1000 only includes two drive wheels 1020 and further includes two non-drive wheels 1021. However, the lawn-tractors 1000 still includes multiple actuators (e.g., the arm actuators 1049 and the implement actuators 1050) and a quick-attach assembly 1036. While the quick-attach assembly 1036 is slightly different than the quick-attach assembly 36 (e.g., the locking mechanism 1038 is a pin and the quick-attach assembly 1036 does not include pointed portion 38), the quick-attach assembly 1036 accomplishes the same function, quick removable coupling of the lift arms 1012 and the bucket 1044.

Referring now to FIGS. 7-10, the frame 110 is shown in more detail. The frame 110 includes a front end 112, a rear end 113 opposite the front end 112, a right side 114, and a left side 115 opposite the tight side 114 (frame of reference is in regards to normal direction of travel of the skid-steer 10 operatively coupled to the frame 110). Additionally, the frame further includes multiple cross bars 116 extending longitudinally from proximate the front end 112 to proximate the rear end 113, an intermediate bar 128, and a chain receiving bar 118 located proximate the front end 112 and having multiple coupling members 120. The cross bars 116 define the main portion of the frame 110 and define most of the width (length from right side 114 to the left side 115) and length (length from front end 112 to the rear end 113) of the frame 110. The cross bars 116 are shown to include a circular cross section, but may include any shape of cross section (e.g., square, rectangular, triangular, an I-beam shape, etc. Additionally, the frame 110 is shown to include 6 cross bars 116, but may include any number of cross bars 116 (e.g., 0, 2, 4, 6, 8, 10, etc.). The cross bars 116 provide the main portion of support for the received large animal and is able to support, lift, hold, large amounts of weight (e.g., 2,000 lbs or greater). As such, the cross bars 116 act as the animal receiving portion of the frame 110, providing a support structure through which the animal is moved, lifted, and/or received. Because of this, the cross bars 116 are generally made of a strong, rigid, material including many forms of metal (e.g., steel, stainless steel, cast-iron, aluminum, etc.) and rigid polymers. In some embodiments, the frame 110 does not include multiple cross bars 116, but instead includes another animal receiving portion that replaces the cross bars 116. The animal receiving portion may consist of a single piece (e.g., one cast piece of metal) that performs the same function as the multiple cross bars 116. In some embodiments, the cross bars 116 do not extend longitudinally but extend laterally (e.g., from the right side 114 to the left side 115).

The cross bars 116 are coupled at one end (proximate the front end 112) to the chain receiving bar 118 and at another, opposite (proximate the rear end 113), end to the intermediate bar 128. As shown, each cross bar 116 is hollow proximate the front end 112 and includes one or more receiving holes 124 as well as one or more coupling plates 121 and fasteners 122 (best seen in FIG. 13). The coupling plates 121 and fasteners 122 may help facilitate the coupling between the chain receiving bar 118 and the cross bars 116, as well as allow for adjustment of the frame 110 (e.g., lengthening and shortening the frame 110) by changing the amount of the coupling members 120 received by the receiving holes 124 and then locking both into place. The receiving holes 124 are configured (e.g., are slightly (0.01 inches to 1 inch) larger in diameter than the coupling members 120) to receive the couplings members 120. In some embodiments, each receiving hole 124 is configured to receive a single coupling member 120. The coupling members 120 are integrally formed as part (e.g., are a part) of the chain receiving bar 118, in this way, when the coupling members 120 are received by the respective receiving hole 124, the chain receiving bar 118 is removably coupled to the cross bars 116 and the rest of the frame 110. In some embodiments, the chain receiving bar 118 does not include the coupling members 120 and instead is coupled to the cross bars 116 through other methods (e.g., hole and fastener, welding, rivets, adhesives, etc.), In even other embodiments, the chain receiving bar 118 is pivotally coupled to the cross bars 116. In additional embodiments, the chain receiving bar 118 is integrally formed as a part of the cross bars 116 (e.g., the cross bars include an end that is formed as a chain receiving bar 118. Operation and configuration of the chain receiving bar 118 will be described further herein, however similar to the cross bars 116, the chain receiving bar 118 may have any shaped cross section.

The cross bars 116 are coupled (proximate the rear end 113) to the intermediate bar 128. The intermediate bar 128 is shown to be integrally formed as a portion (e.g., was cast as a part) of the cross bars 116. In other embodiments, the intermediate bar 128 may be coupled to the cross bars 116 through other means (e.g., welding, hole and fastener, integral bars (similar to the coupling members 120 and the receiving holes 124), rivets, adhesives, etc.) The intermediate bar 128 is shown to include a rectangular cross section, but may include any shape of cross section (e.g., circular, oval, square, I-beam shape, etc.) The intermediate bar 128 simply couples the cross bars 116 that hold the weight of the received animal to the connecting bar 132. In this way, the intermediate bar 128 also receives much of the weight of the received animal and is made of a rigid material (similar to the cross bars 116). As previously stated, as the intermediate bar 128 is simply an intermediate between the connecting bar 132 and the cross bars 116, it may be integrally formed as one of the connecting bar 132 or the cross bars 116. For example, in some embodiments, the frame 110 includes no cross bars 116 but instead includes an enlarged intermediate bar 128 that covers the same area as both the intermediate bar 128 and the cross bars 116.

The intermediate bar 128 is coupled to the connecting bar 132 through a right side bar 129 and a left side bar 130. The right side bar 129 is located proximate the rear end 113 and the right side 114. Similarly, the left side bar 130 is located proximate the rear end 113 and the left side 115. Both the right side bar and the left side bar 130 are integrally formed as a member of (e.g., were cast as a part) of the intermediate bar 128 and the connecting bar 132. In other embodiments, the right side bar 129 and the left side bar 130 may be coupled to at least one of the intermediate bar 128 and the connecting bar 132 through other means (e.g., welding, hole and fastener, integral bars (similar to the coupling members 120 and the receiving holes 124), rivets, adhesives, etc.) Both the right side bar 129 and the left side bar 130 are shown to include a rectangular cross section, but may include any shape of cross section (e.g., circular, oval, square, I-beam shape, etc.) and are structured to provide a drive shaft area 134 between the connecting bar 132 and the intermediate bar 128. In this way, a drive shaft 520 may be located within/proximate the drive shaft area 134 and between the intermediate bar 128 and the connecting bar 132. The right side bar 129 and the left side bar 130 each include a hole 136 through which the drive shaft 520 is rotatably coupled to both the right side bar 129 and the left side bar 130. In this way, the drive shaft 520 is held in place (e.g., within the drive shaft area 134) while being allowed to rotate/operate. In some embodiments, each hole 136 is through hole that allows the drive shaft 520 to be received therein. In other embodiments, one hole 136 (e.g., the hole 136 located within the right side bar 129 is a through hole that allows the drive shaft 520 to be received therein and the hole 136 located within the left side bar 130 is not a through hole, but rather provides a direct attachment (e.g., through collars, bolts, or other fasteners) to the left side bar 130.

Still referring to FIGS. 7-10, the right side bar 129 is further coupled to a coupling plate 135. The coupling plate 135 is integrally formed as a member of (e.g., were cast as a part) of the right side bar 129. In other embodiments, the coupling plate 135 may be coupled to the right side bar 129 through other means (e.g., welding, hole and fastener, integral bars (similar to the coupling members 120 and the receiving holes 124), rivets, adhesives, etc.). The coupling plate 135 is structured to couple the drive motor 510 to the frame 110 (proximate the rear end 113 and the right side 114). In even other embodiments, the coupling plate 135 and the drive motor 510 are coupled to the left side bar 130 and located proximate the rear end 113. In other embodiments, the drive motor 510 is coupled to the right side bar 129 and the frame 110 through other means (e.g., a hole and multiple fasteners, adhesives, welding, etc.).

The connecting bar 132 is located proximate the rear end 113 and provides a connecting structure between the skid-steer 10 and the frame 110 (that holds the large animal therein). As such, the connecting bar 132 is coupled to the right side bar 129, the left side bar 130, and includes and/or is coupled to a quick-attach receiver 140. The quick-attach receiver 140 is similar to the quick-attach receiver 45 and the quick-attach receiver 1045 and includes a raised portion 144 having multiple protrusions including an angled portion 147 and two locking portions 149. In operation, the quick-attach receiver 140 is structured to receive a quick-attach assembly (e.g., the quick-attach assembly 36) and removably couple the frame 110 (and therefore the large animal lifting and moving apparatus 100) to the skid-steer 10 or other outdoor power equipment. In this way, the skid-steer 10 and/or the other outdoor power equipment may raise, lower, rotate, and/or move the large animal lifting and moving apparatus 100 and the frame 110.

The raised portion 144 extends relatively vertically from the frame 110 and is coupled to the connecting bar 132. The coupling raised portion 144 is integrally formed as a member of (e.g., were cast as a part) of the connecting bar 132. In other embodiments, the raised portion 144 may be coupled to the connecting bar 132 through other means (e.g., welding, hole and fastener, integral bars (similar to the coupling members 120 and the receiving holes 124), rivets, adhesives, etc.). The raised portion 144 provides the structure for which many components of the quick-attach receiver 140 protrude as well as acts as a guard to keep the large animal from rolling off the frame 110. In some embodiments, the raised portion 144 further includes edge guards or other features that better keep the large animal situated on the animal receiving portion in approximately the center of the frame 110.

Figure 10:
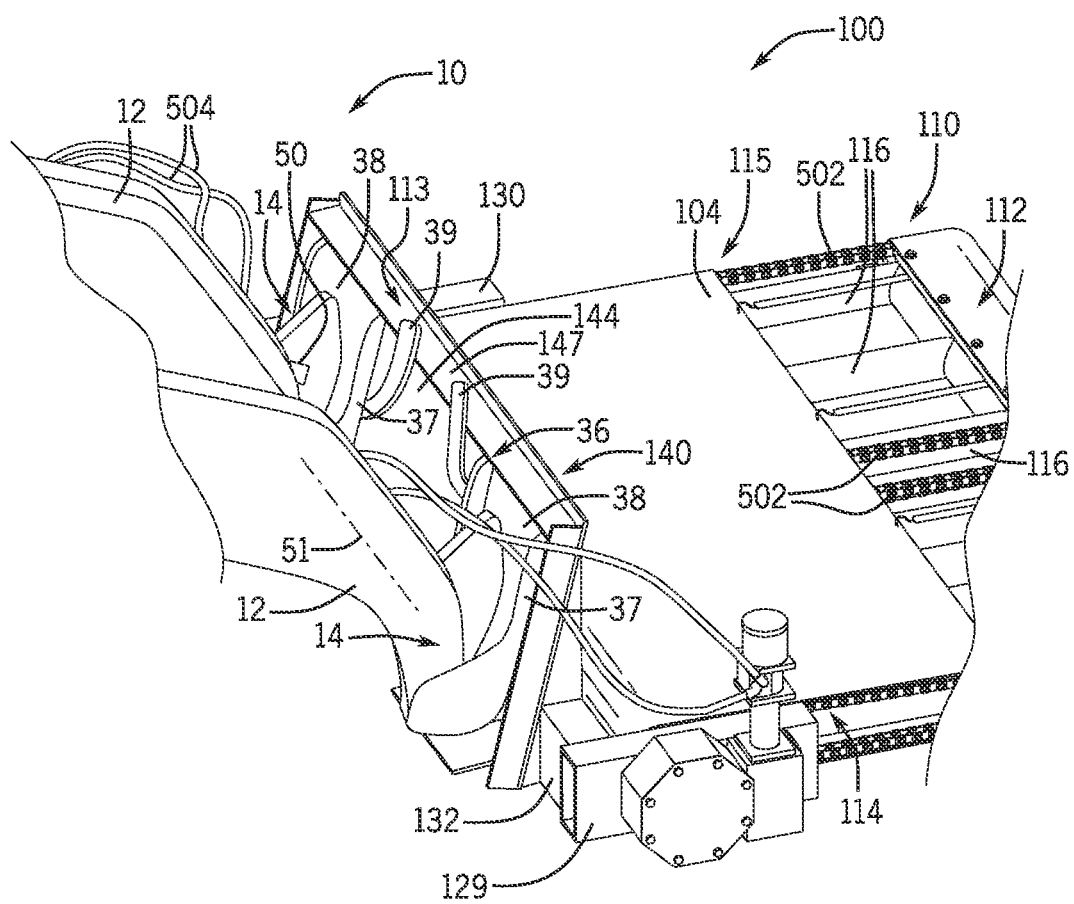
FIG. 10 is a rear perspective view of the large animal lifting and moving apparatus of FIG. 1 removably coupled to the skid-steer of FIG. 1.

The angled portion 147 is structured to receive a pointed portion e.g., the pointed portion 38) and extends outwardly from the raised portion 144. Because the angled portion 147 receives a pointed portion, gravity naturally couples the two together. Because gravity is pulling down on the angled portion 147, the weight of the frame 110 naturally keeps the two (the pointed portion and the angled portion 147) coupled (as shown in FIG. 10). As such, if gravity is removed (e.g., the angled portion 147 is lifted from the pointed portion) without a lock in place, the angled portion 147 and the pointed portion will decouple. In some embodiments, the quick-attach receiver 140 includes other portions that fulfill the function of the angled portion 147 (e.g., the receiving of a pointed portion and removable coupling between the pointed portion and the angled portion 147 due to gravity). Similarly, the locking portions 149 extends outwardly from the raised portion 144, are located below the angled portion 147, and are structured to receive a locking mechanism (e.g., at least a portion of the locking mechanism 39). In this way, as gravity couples the angled portion 147 to the pointed portion (e.g., the pointed portion 38) the locking portion 149 is selectively coupled to at least a portion of a locking mechanism to prevent the pointed portion and angled portion 147 from separating. As such, when the locking mechanism is in the locked position, the quick-attach assembly and the quick-attach receiver 140 are coupled together, and when the locking mechanism is in the unlocked position, the quick-attach assembly and the quick-attach receiver 140 can be uncoupled by separating the angled portion 147 and the pointed portion. In this way, the quick-attach receiver is removably and selectively coupled to the respective quick-attach assembly.

In operation, the skid-steer 10 or other power equipment approach the frame 110 and therefore the large animal lifting and moving apparatus 100 from the rear end 113. Then, the operator situates the lift arms (e.g., the lift arms 12) so that the pointed portion (or the equivalent) of the quick-attach assembly is received by the angled portion 147. At this point, the operator ensures that the bottom portion (e.g., the locking mechanism) is lined up with the locking portions 149 such that when the locking mechanism is moved to the locked position, the locking portions 149 will receive a portion of the locking mechanism that will not allow the portion of the locking mechanism and the locking portions 149 to separate. Then, the operator moves the locking mechanism to the locked position. At this point, the skid-steer 10 or other power equipment is removably coupled to the frame 110 and therefore the large animal lifting and moving apparatus 100. As such, the skid-steer 10 or other power equipment can lift, move, or rotate the large animal lifting and moving apparatus 100. The frame 110 may be a movable frame (i.e., a frame that is capable of being easily moved and/or not designed to be stationary during use and operation) in the ways described above. For example, the frame 110 is structured and configured to be picked up, lowered, pivoted, and transported during regular operation.

While the frame 110 is stationary while being stored, it is not stationary during normal operation (e.g., the picking up and moving of an animal).

As disclosed previously, there are multiple different, well-understood, quick-attach assemblies and quick-attach receivers, the most common of which is discussed and shown as the quick-attach receiver 140. It should be understood that any of these quick-attach receivers can be implemented in place of the quick-attach receiver 140 within the large animal lifting and moving apparatus 100. Including the European/Global standard quick-attach system/receiver that commonly implements a spring locking mechanism, the John Deere® style quick-attach receiver, the New Holland® style quick-attach receiver (similar to the one shown in FIG. 6), and any other quick-attach receivers that are configured/structured to removably couple to a quick-attach receiver of outdoor power equipment.

It should also be understood that all of the components of the frame 110 may be made of the same material or roughly different materials. In some embodiments, all of the components of the frame 110 are made of a rigid metal having a high strength (e.g., steel, iron, cast iron, aluminum, titanium, etc.). In other embodiments, all of the components of the frame 110 are made of a rigid polymer having a high strength and relatively low density. Because of the large weight (e.g., 0-100,000 lbs.) of the large animal, the frame 110 should have a high strength and rigidity and not be prone to bending or breaking. In this way, the frame 110 can support the weight of the large animal and still be easily movable.

Figure 11:
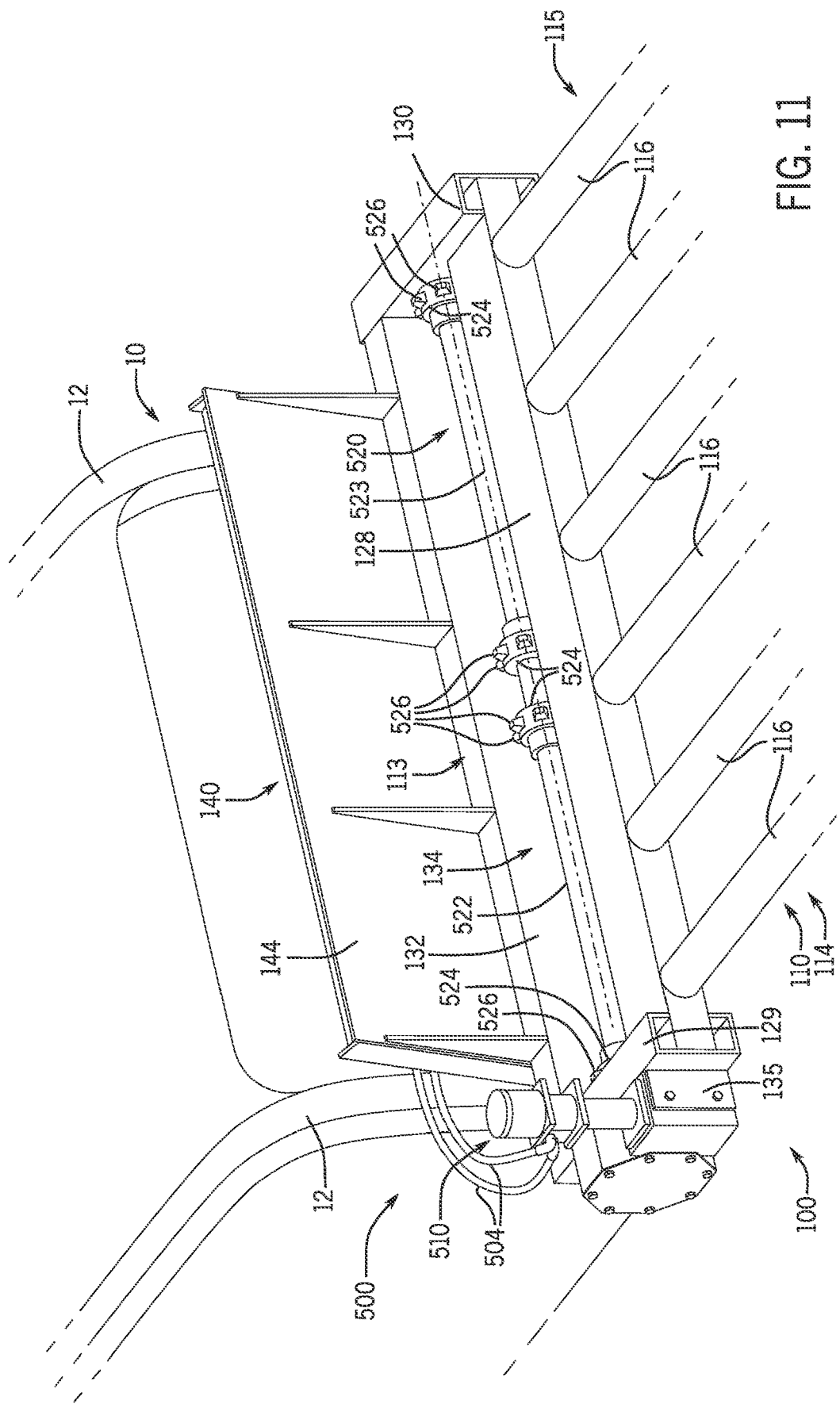
FIG. 11 is a perspective view of a drive system of the large animal lifting and moving apparatus of FIG. 1.
Figure 12:
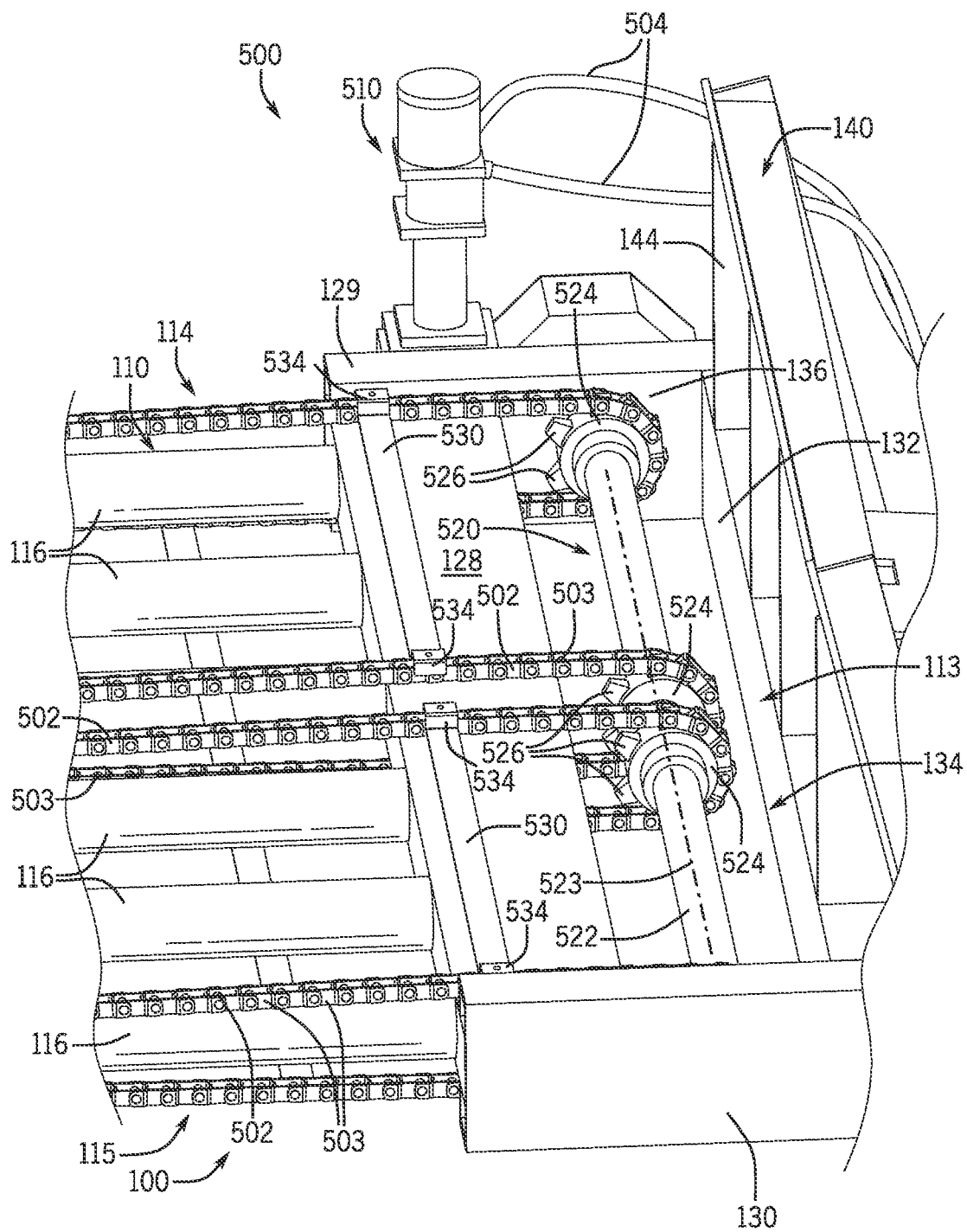
FIG. 12 is a side perspective view of the drive system of FIG. 11, according to an exemplary embodiment.
Figure 13:
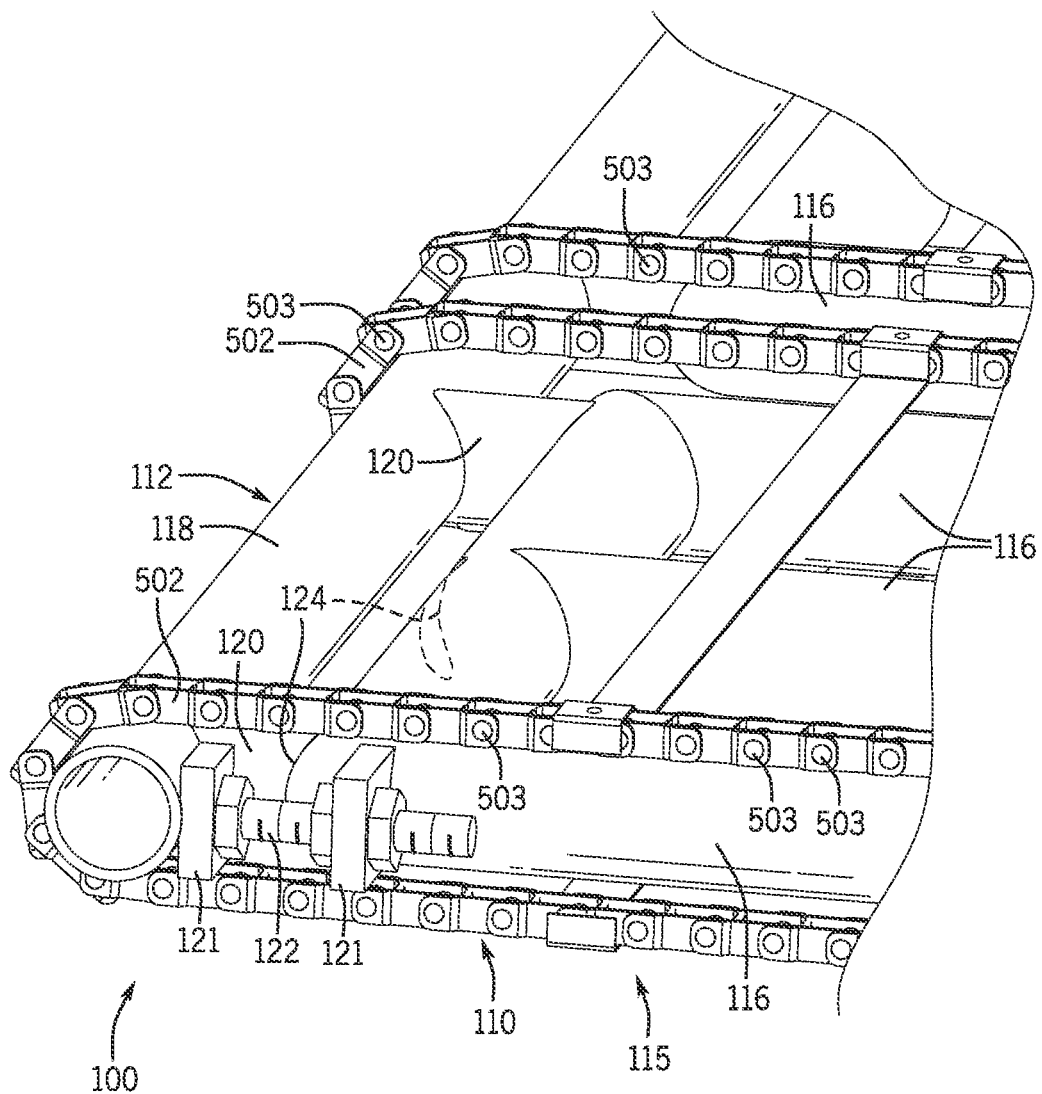
FIG. 13 is a front, side, perspective view of a roller chain of the drive system of FIG. 11, according to an exemplary embodiment.

Referring now to FIGS. 11-13, the drive system 500 of the large animal lifting and moving apparatus 100 is shown in more detail. The drive system 500 includes the drive motor 510, the drive shaft 520, and the one or more roller chains 502. The drive motor 510 is selectively powered by a power source (e.g., a source outside of the large animal lifting and moving apparatus 100 that provides power). In one embodiment, the power source is a hydraulic fluid power source. In another, the power source is an electrical power source. As shown, the drive motor 510 is fluidly coupled to the auxiliary hydraulic output 52 through a fluid conduit 504 and the auxiliary hydraulic return 56 through another fluid conduit 504. In this way, the drive motor 510 receives pressurized hydraulic fluid (through the auxiliary hydraulic output 52 and the fluid conduit 504) from the hydraulic system 80 (or a similar hydraulic system). The drive motor 510 is a hydraulic motor that powers the various components of the drive system 500 using the pressurized hydraulic fluid and then returns the used hydraulic fluid (through the auxiliary hydraulic return 56 and the fluid conduit 504) to the hydraulic system 80. In this way, the drive motor 510 receives the pressurized hydraulic fluid and creates torque. The pressurized hydraulic fluid may be any type of hydraulic fluid including synthetic hydraulic fluids, petroleum based hydraulic fluids, and water-based hydraulic fluids. Additionally when pressurized, the hydraulic fluid may have a range of pressures from 0-5,000 PSI (pounder per square inch) (0-345 Bar). In this way, the fluid conduits 504 may be high pressure conduits that are capable of handling pressures from 0-5,000 PSI (0-345 Bar).

The drive motor 510 is coupled to and operates the drive shaft 520 at a first end (proximate the tight side 114 and the rear end 113 and through the hole 136). The drive shaft 520 is a shaft having a main portion 522 extending the length of the drive shaft 520, the main portion 522 having a circular cross section and coupled to one or more roller chain sprockets 524. In operation, the drive motor 510 selectively provides torque to the drive shaft 520 and rotates the drive shaft 520 (and therefor the main portion 522 and the roller chain sprockets 524) about the drive axis 523. In one embodiment the drive motor 510 only rotates the drive shaft 520 clockwise (using the frame of reference from FIG. 12 (i.e., looking from the left side 115)) about the drive axis 523. In other embodiments, the drive motor 510 only rotates the drive shaft 520 counter-clockwise (using the frame of reference from FIG. 12 (i.e., looking from the left side 115)). In even other embodiments, the drive motor 510 selectively rotates the drive shaft 520 either counter-clockwise or clockwise (using the frame of reference from FIG. 12 (i.e., looking from the left side 115)) about the drive axis 523.

Each roller chain sprocket 524 further includes multiple teeth 526 that couple the respective roller chain sprocket 524 to a respective roller chain 502 through multiple links 503 of the roller chain 502. Each link 503 engages with and receives tension from a single tooth 526 of the roller chain sprocket 524. In this way, when the drive motor 510 operates the drive shaft 520, each roller chain sprocket 524 is coupled to and operates the respective roller chain 502. In some embodiments, each roller chain 502 further includes a roller chain connector 534 that couples to a roller chain coupler 530. Each roller chain coupler 530 couples two or more roller chains 502 together by attaching or coupling to the roller chain connector 534. The roller chain couplers 530 prevent the roller chains 502 from moving laterally (e.g., toward the right side 114 or the right side 115) but allow each roller chain 502 to rotate as normal. In this way, the roller chain 502 is prevented from falling off of the frame 110. Each roller chain 502 extends the length (e.g., extends from the front end 112 to the rear 113) of and wraps about the frame 110. Proximate the rear end 113, each roller chain 502 wraps about the respective roller chain sprocket 524. Proximate the front end 112, each roller chain 502 wraps about the chain receiving bar 118. In this way, the roller chains 502 wrap around (under the bottom of and over the top of) the chain receiving bar 118, one or more of the cross bars 116, the intermediate bar 128, and the drive shaft 520. As such, when the drive motor 510 operates the drive shaft 520, all of the roller chains 502 rotates about (in the same direction as the drive shaft 520) the chain receiving bar 118, one or more of the cross bars 116, the intermediate bar 128, and the drive shaft 520. In some embodiments, the chain receiving bar 118 further includes one or more roller chain sprockets 524 and rotates about an axis extending the length of the chain receiving bar 118. In even other embodiments, the chain receiving bar 118 further includes multiple chain couplers (similar to the roller chain couplers 530) that keep each roller chain 502 from moving laterally (e.g., toward the right side 114 or the right side 115) at the front end 112 but allow each roller chain 502 to rotate. To adjust the roller chains 502, the user must adjust the coupling plates 121 and the fasteners 122. By adjusting both the coupling plates 121 and the fasteners 122, the roller chains 502 can be either tightened or loosened about the frame.

While the drive system 500 is shown to include four roller chain sprockets 524 and four roller chains 502 (one roller chain 502 operatively coupled to each roller chain sprocket 524), the drive system 500 may include more or less than four. In some embodiments, the drive system 500 only includes two roller chain sprockets 524 and two roller chains 502 (e.g., one located proximate the right side 114 and one located proximate the left side 115). In even other embodiments, the drive system 500 may include 1-10 roller chains sprockets 524 and roller chains 502. Additionally, while the roller chains 502 are shown to be apron chains, they may be any type of chains that are configured to be driven by a sprocket or gear (e.g., the roller chain sprocket 524). In one embodiment, the roller chains 502 may be push chains. In other embodiments, the roller chains 502 may be at least one of multiple strand roller chains, self-lubricated roller chains, pre-lobed roller chains, offset roller chains, detachable chains, silent chains, and any other common types of mechanical chains. Additionally, the roller chain sprockets 524 may be any type of sprockets or gears capable of driving the respective roller chain 502.

In operation, the operator controls (e.g., the user controls 28) of the outdoor power equipment (e.g., the skid-steer 10) control the drive system 500. For example, the drive motor 510 will not operate or drive the drive shaft 520 until pressurized hydraulic fluid is supplied by the auxiliary hydraulic output 52. Therefore, the operator of the outdoor power equipment selectively provides pressurized hydraulic fluid through the auxiliary hydraulic output 52 and the respective fluid conduit 504. When pressurized hydraulic fluid is selectively provided, the drive motor 510 operates (drives) the drive shaft 520 about the drive axis 523. As the drive shaft 520 rotates about the drive axis 523, the roller chain sprockets 524 rotate about the drive axis 523 (in the same direction as the drive shaft 520) as well. As the roller chain sprockets 524 are each coupled to a respective roller chain 502, the roller chains are then driven (rotated in the same direction as the roller chain sprockets 524) about the frame 110. In this way, the operator of the outdoor power equipment operates the drive system 500.

While the drive system 500 is a hydraulic-type drive system (e.g., is powered from the skid-steer 10 by a hydraulic fluid source) it should be understood that any type of drive system is capable of being used in place of the drive system 500. For example, in one embodiment the drive system 500 is an electric-type drive system and receives electrical power from the outdoor power equipment (e.g., an electrical power source, including alternative embodiments of the skid-steer 10). In this way, the drive motor 510 may be an electric motor that receives electrical power and transforms it into mechanical torque that is then provided to the drive shaft 520. In another embodiment, the drive system 500 is a mechanical-type drive system and receives mechanical power from a PTO drive (or similar component) from the outdoor power equipment (including alternative embodiments of the skid-steer 10). In this way, the drive motor 510 acts more as a transmission receiving mechanical power from the PTO drive and changing the speed and torque of the received mechanical power. In even other embodiments, there may be no drive motor 510 and the drive system 500 is directly powered by a PTO shaft (or similar component) from the outdoor power equipment (including alternative embodiments of the skid-steer 10). In more embodiments, the drive system 500 is a pneumatic-type drive system powered via pressurized air. In further embodiments, there may be no drive motor 510 and the drive system 500 is powered by a human using a hand crank and/or a hand winch (i.e., manually powered). In this way, the skid-steer 10 is used to move the large animal and the hand crank and/or the hand winch is used to lift the large animal onto the large animal lifting and moving apparatus 100.

Figure 14:
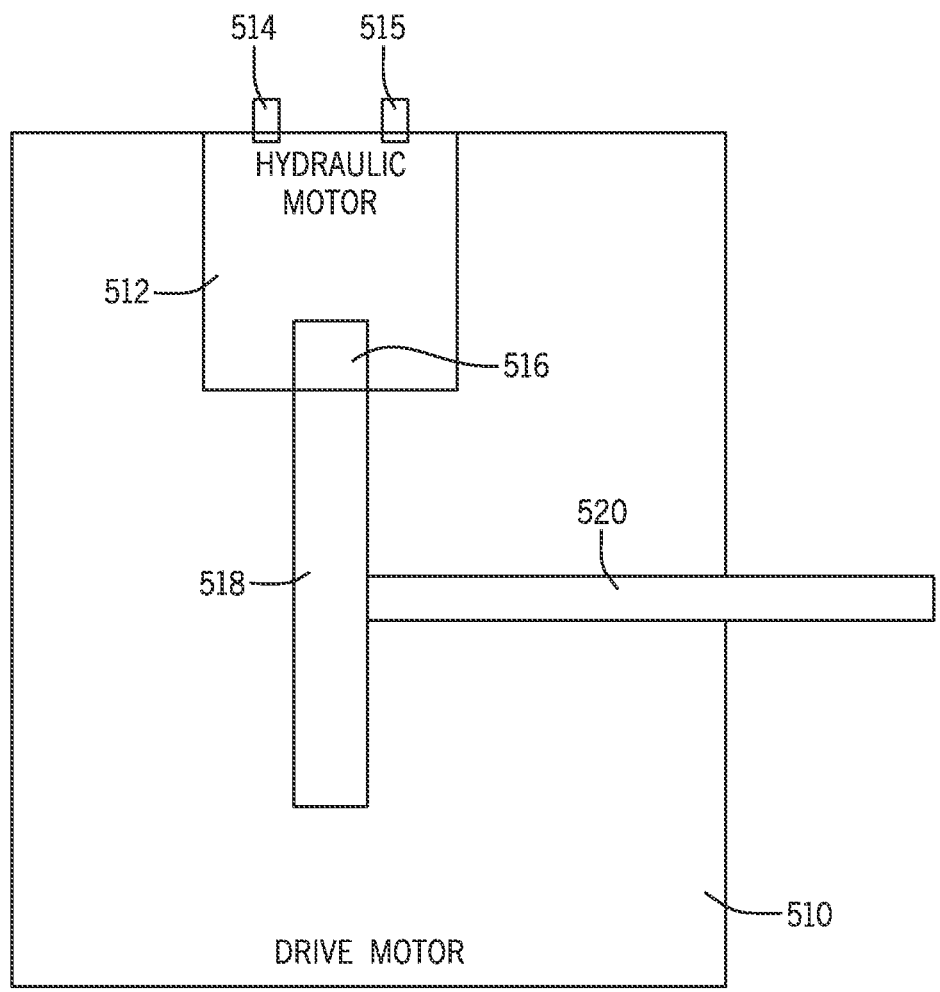
FIG. 14 is a block diagram of a drive motor of the chive system of FIG. 11, according to an exemplary embodiment.

Referring now to FIG. 14, a block diagram of the drive motor 510 is shown, according to an exemplary embodiment. As shown, the drive motor 510 includes a hydraulic motor 512 having a hydraulic fluid inlet 514 and a hydraulic fluid outlet 515. In operation, the hydraulic motor 510 receives pressurized hydraulic fluid through the hydraulic fluid inlet 514 from an external hydraulic fluid pump or reservoir (e.g., from the auxiliary hydraulic output 52) and converts the pressure of the fluid into mechanical power (e.g., torque). This can be accomplished through a variety of methods (e.g., applying pressurized fluid on gear teeth, on a piston, or on a vane, etc.) that are well known. After the hydraulic fluid is used, the hydraulic fluid exits the hydraulic motor 512 through the hydraulic fluid outlet 515. In one embodiment, the hydraulic motor 512 is a rotary hydraulic motor that includes large gear teeth which the pressurized hydraulic fluid apply a force on. The hydraulic motor 512 is further coupled to a worm screw 516 through which the mechanical power of the hydraulic motor 512 is transferred. As such, the mechanical torque from the hydraulic fluid rotates the worm screw 516. While the drive motor 510 uses the hydraulic motor 512, in alternative embodiments, the drive motor 510 may be use different types of motors (e.g., an electric motor).

The worm screw 516 is meshed with a gear 518 through which the mechanical energy is transferred. As the worm screw 516 rotates, the gear 518 rotates (much slower) as well transferring the direction of rotation 90 degrees. The gear 518 is then coupled to the drive shaft 520 through which the torque is applied. In this way, the drive motor 510 drives the drive shaft 520. The worm screw 516 may be used because of the ability to create high amounts of torque through the gear 518. As such, the worm screw 516 may be a single-start worm screw (i.e., for every 360 degree rotation of the worm screw 516 the gear advances one tooth), a two-start worm screw, a three-start worm screw, a four-start worm screw, or greater. In this way, the worm screw 516 creates a large amount of torque while significantly slowing the rotational speed of the drive shaft 520. High amounts of torque at low speeds provide enough force to lift the large animal, while still moving slow enough to prevent any jerking of the animal. As such, the gear ratio between the worm screw 516 and the gear 518 may be 20:1, 40:1, 50:1, 100:1 (e.g., relatively large) to provide a large amount of torque to the gear 518 and the drive shaft 520 at low rotational speeds. In some embodiments, different types of gear arrangements may be used including ones that do not include the worm screw 516 or the gear 518.

Figure 15:
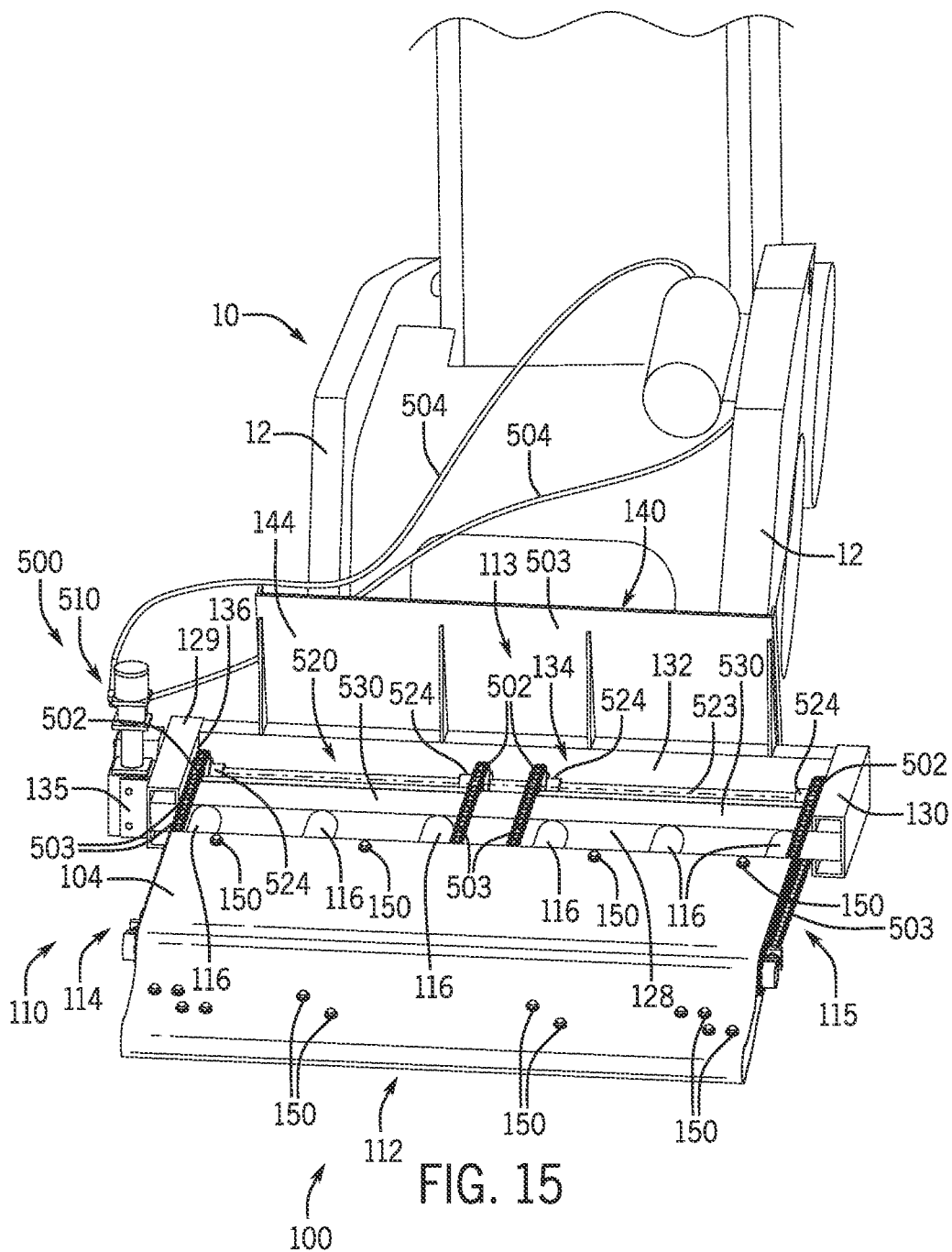
FIG. 15 is a front perspective view of the large animal lifting and moving apparatus of FIG. 1.
Figure 16:
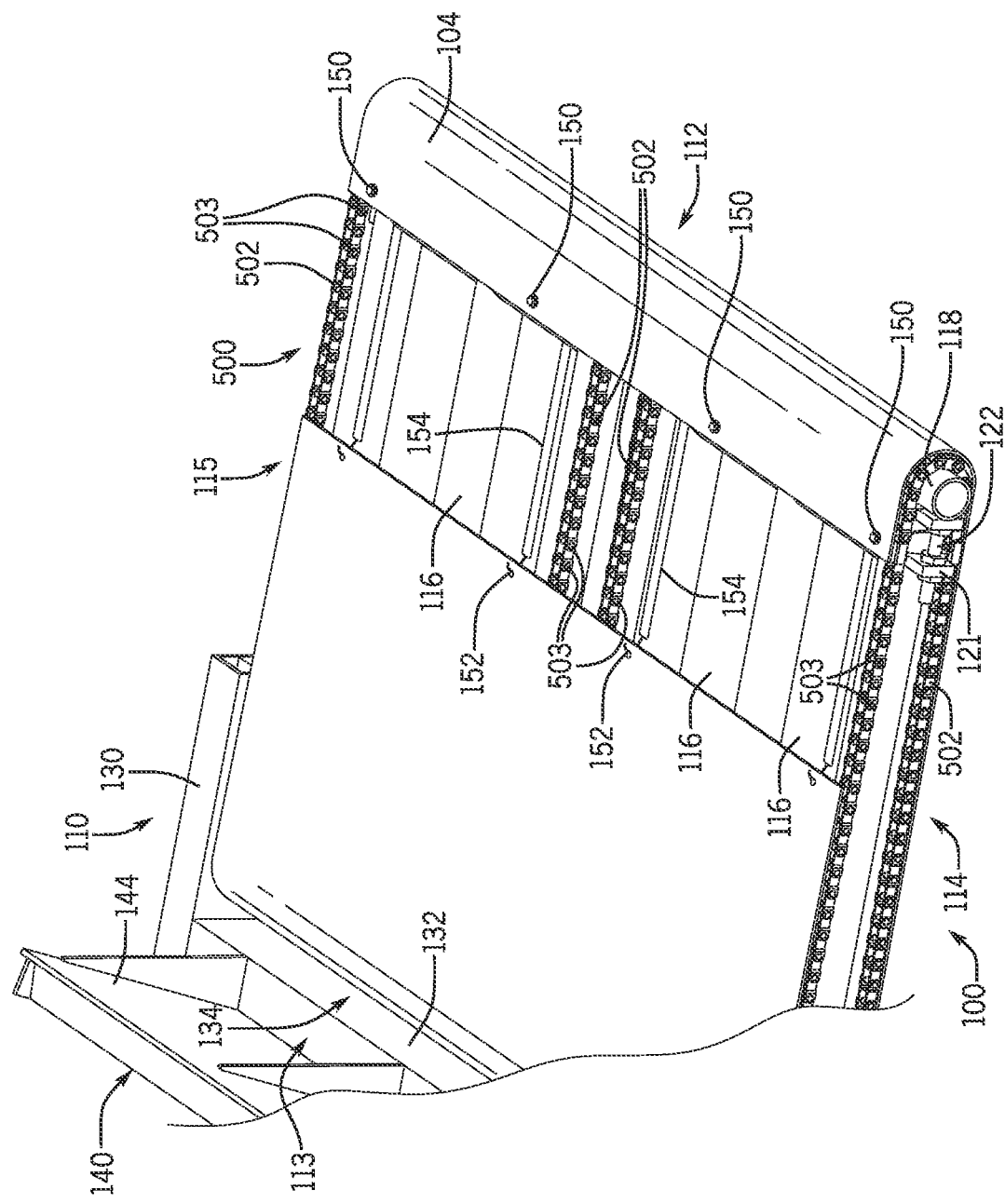
FIG. 16 is a side view of the large animal lifting and moving apparatus of FIG. 1
Figure 17:
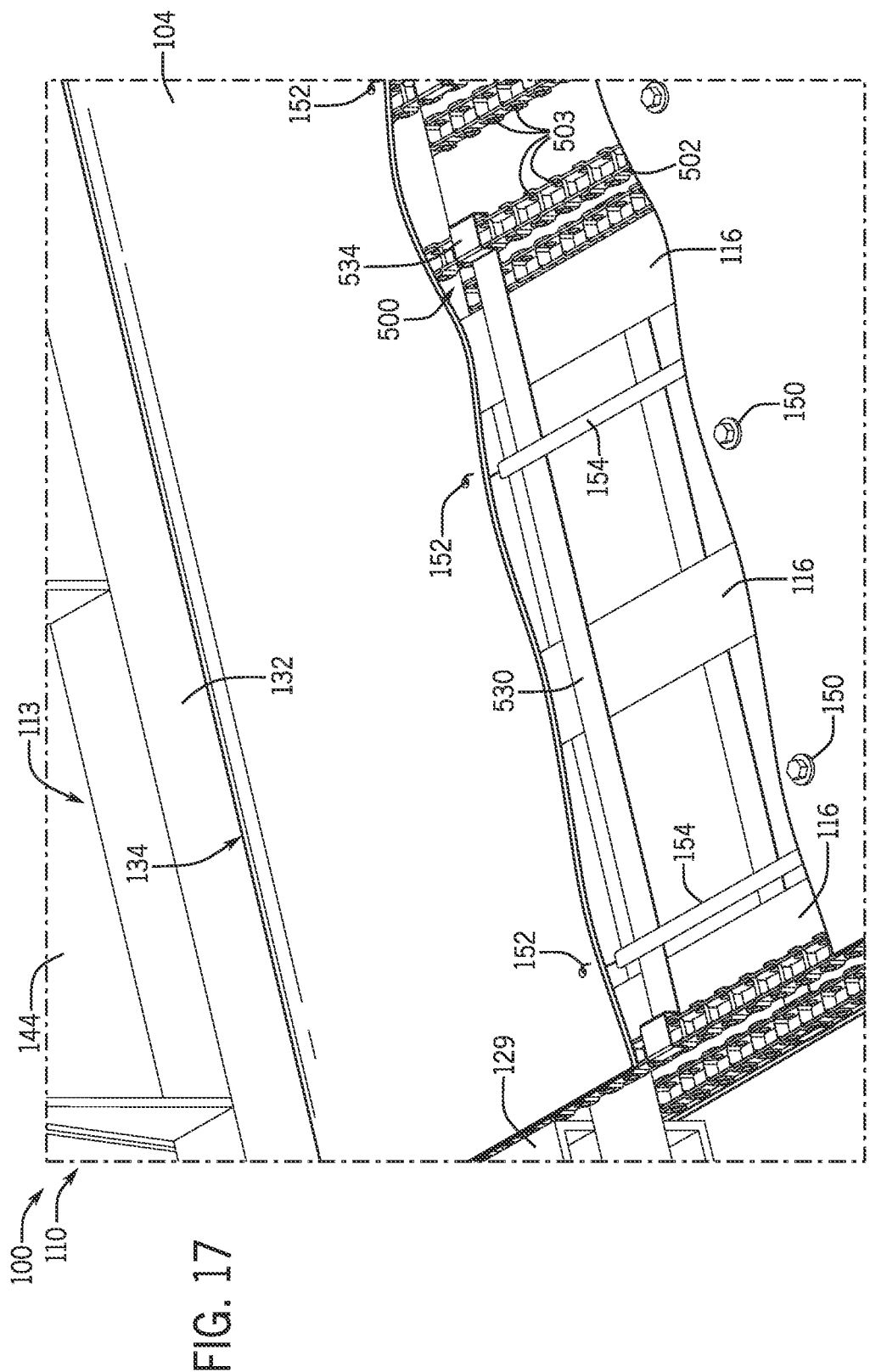
FIG. 17 is a top, center, view of the large animal lifting and moving apparatus of FIG. 1.

Referring now to FIGS. 15-17, the large animal lifting and moving apparatus 100 is shown with the cover 104 coupled to the roller chains 502. The cover 104 provides a separation from the frame 110 so as to keep the large animal received by the frame 110 from getting caught in the moving roller chains 502. In this way, the cover 104 may be made of a soft, water resistant, material that allows the large animal to be supported by the frame and easily moved. For example, the cover 104 may be made of rubber, polystyrene, polypropylene, or various other polymers that are rigid yet soft and water resistant. In some embodiments, the cover 104 is made of similar materials and/or is a conveyor belt. In other embodiments, the cover 104 may be made of similar materials as the frame 110. The cover 104 may further include grip portions (e.g., raised grooves) that provide a gripping surface. In this way, the large animal is better held by the cover 104 and the cover 104 resists allowing the large animal to roll around. Additionally, when the large animal is being moved onto the cover 104 this gripping surface can better facilitate the movement of the animal (as the surface at least partially grips the large animal).

The cover 104 is coupled to the roller chains 502 through one or more cords 154 attached to holes 152 of the cover 104 as well as the roller chain couplers 530. The cords 154 may be any type of cord, rope, strap (e.g., a ratchet strap) that provides a tension from one end of the cover 104 to another end. As shown, the cords 154 are received by the holes 152 and wrap about one or more roller chain couplers 530. To further couple the cover 104 to the roller chains 502, the cover 104 may receive multiple fasteners 150 that couple directly to the roller chain couplers 530. In this way, the cords 154 provide tension to the cover 104 keeping the cover 104 taught during operation and the fasteners 150 directly attach the cover 104 to the roller chain couplers 530. As previously described the roller chain couplers 530 may couple to two or more roller chains 502 through the roller chain connector 534. During operation when the roller chains 502 are rotating about the frame 110, the roller chains connectors 534 may stay coupled to a link 503 and rotate with the roller 502. The roller chain couplers 530 then attach to multiple roller chain connectors (through one or more fasteners, welding, etc.) and rotate with the roller chains 502 as well. Then, the cover 104 is coupled to the roller chain couplers 530 through the fasteners 150 and also moves/rotates about the frame 110 with the roller chains 520. In some embodiments, there is two roller chain couplers 530 (one between the two roller chains 502 on the left side 115 and one between the two roller chains 502 on right side 114). In other embodiments, there may be more than two roller chain couplers 530.

Each cord 154 then attaches to the cover 104 through the holes 152 as well as wraps about one or more of the roller chain couplers 530. In this way, each cord 154 provides tension to both ends of the cover 104 and keeps the cover 104 taught (e.g., not falling to the ground). In some embodiments, there are four cords 154. In other embodiments, there is more or less than four cords 154. In even other embodiments, the cover 104 is coupled to the roller chains 502 through different methods (e.g., is directly attached through the cords 154, receives at least part of the roller chains 502, is integrally formed with the roller chains 502, etc.). In this way, when the drive system 500 operates the roller chains 502, the cover 104 rotates at the same speed and in the same direction as the roller chains 502.

Figure 18:
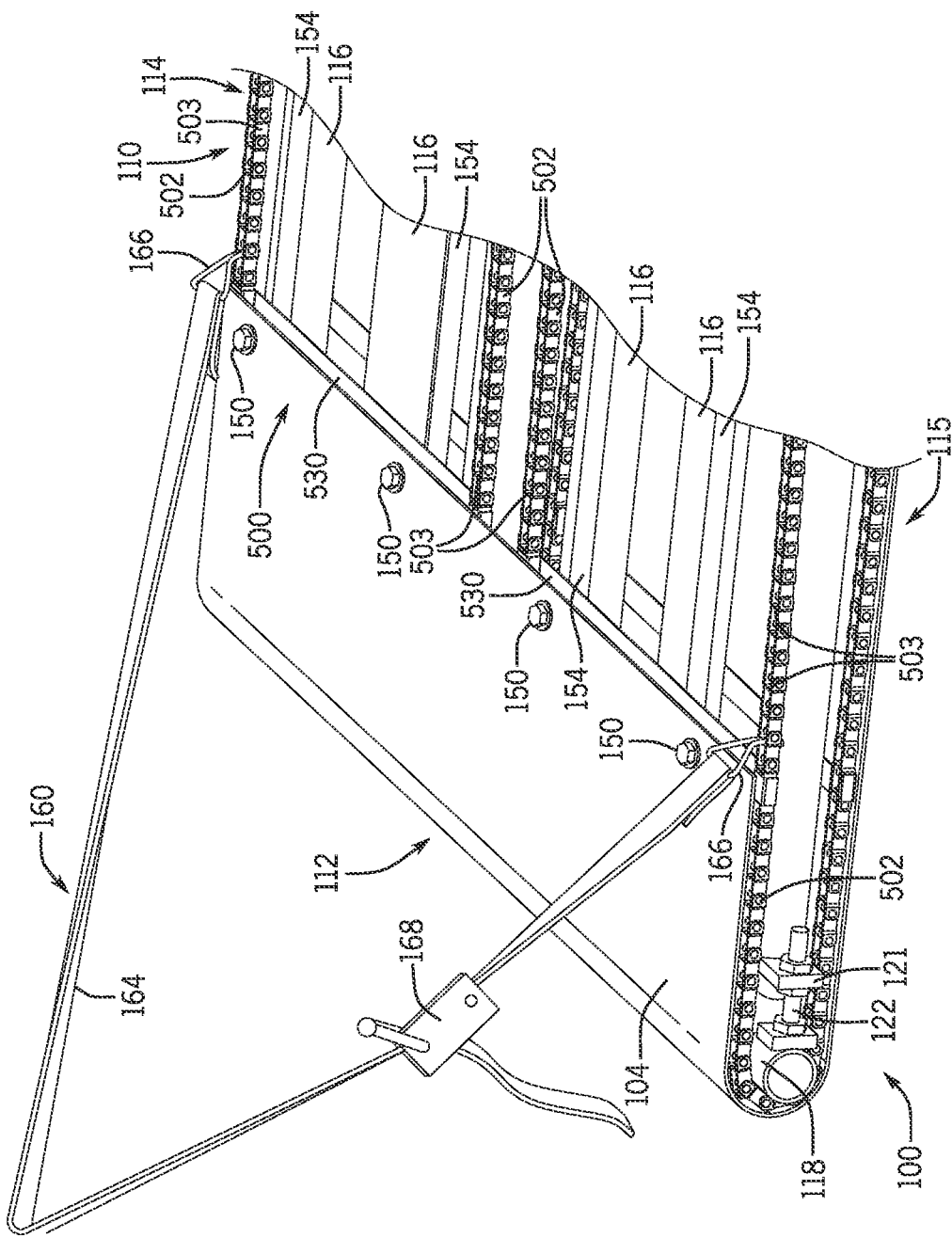
FIG. 18 is a perspective view of the large animal lifting and moving apparatus of FIG. 1 removably coupled to a strap, according to an exemplary embodiment.

Referring now to FIG. 18, the large animal lifting and moving apparatus 100 is further shown to include a removable strap 160. The removable strap 160 includes, a strap portion 164, two attachment ends 166, and an adjustment mechanism 168. The removable strap 160 is structured to removably couple to one or more of the roller chains 502 (e.g., through the attachment ends) as well as the large animal and facilitate the movement of the large animal onto the cover 104, the frame 110 (e.g., by the animal receiving portion), and therefore the large animal lifting and moving apparatus 100. In operation, the strap portion 164 is positioned around the large animal (e.g., around the animals hips, ribs, neck, or one or more combinations) and each attachment end 166 is removably coupled to one or more roller chains 502. In some embodiments, there is two attachment ends 166 and each attaches to a single roller chain 502 (e.g., the roller chain 502 closest to the left side 115 and the roller chain 502 closest to the right side 114). In other embodiments, there are four attachment ends 166 and each attaches to a single roller chain 502. Once the attachment ends 166 are removably coupled to the attachment ends 166 and the strap portion 164 is positioned around the large animal, the user may adjust the strap through the adjustment mechanism 168 (e.g., tighten or loosen the removable strap 160). In some embodiments, the strap 160 may be a rope, a member of the cover 104, a harness structured to facilitate the lifting of large animals, or other devices that are capable of removably attaching to the large animal and the roller chains 502.

To then move and lift the large animal onto the cover 104, the frame 110, and the large animal lifting and moving apparatus 100, the drive motor 510 is selectively operated by the outdoor power equipment (e.g., the skid-steer 10) and drives the drive shaft 520 clockwise (using the frame of reference from FIG. 12 (i.e., looking from the left side 115)). This rotates the roller chain sprockets 524, the roller chains 502 coupled thereto, the cover 104 coupled to the roller chains 502, the strap 160, and the large animal attached thereto. This pulls the large animal into contact with the cover 104 and the grip portions of the cover 104 as well as the strap 160, together, move the animal up and onto the large animal lifting and moving apparatus. The drive motor 510 is operated until the user/operator is satisfied with where the large animal is located on the large animal lifting and moving apparatus 100. At this point, the removable strap 160 may be decoupled from the large animal and the roller chain 502. In some embodiments, the removable strap 160 is not decoupled and acts as a support/harness, keeping the large animal in a desired location on the large animal lifting and moving apparatus.

Once the large animal is supported and received by the large animal lifting and moving apparatus (i.e., is on the frame 110), the outdoor power equipment (e.g., the skid-steer 10) can be moved to wherever the user would like to go. For example, in a situation where a user has a down cow, the user may enter the outdoor power equipment and move it to the large animal lifting and moving apparatus 100. The user may then removably couple the outdoor power equipment to the large animal lifting and moving apparatus through the quick-attach receiver 140 and a respective quick-attach assembly. At this point (and using the user controls (e.g., the user controls 28)), the user may move the outdoor power equipment and the large animal lifting and moving apparatus 100 to the down cow. At this point, the user may get out of the outdoor power equipment and attach the removable strap 160 to the cow as well as to the roller chains 502. The user may then enter the outdoor power equipment and operate the drive system 500 using the user controls. The drive system 500 will then move and lift the cow onto the large animal lifting and moving apparatus 100. The user may then lift the cow and the large animal lifting and moving apparatus 100) using the lift arms (e.g., the lift arms 12) and move the skid-steer 10, the large animal lifting and moving apparatus 100 and the cow located therein to a location for softer ground (e.g., a barn with hay). To then remove the cow from the large animal lifting and moving apparatus 100, the user may operate the drive system 500 in the opposite direction to move and lower the cow onto the ground/hay. At this point and if the user would like to use another implement for the outdoor power equipment (e.g., the bucket 44) the user may decouple the large animal lifting and moving apparatus 100 from the outdoor power equipment using the quick-attach receiver 140 and the respective quick-attach assembly.

It should be understood that the large animal lifting and moving apparatus 100 provides a device and method for lifting a large animal by a single person. As shown above in example operation, the user operator of the outdoor power equipment can use the large animal lifting and moving apparatus 100 to lift the large animal with no extra assistance (i.e., no other human help). This provides a large number of advantages including allowing the movement and lifting of large animals in situations where there is only one person available. Commonly at zoos and other large animal parks, two, three, four, or more people are required when moving large animals such as hippopotamuses, rhinoceroses, tigers, bears, etc. This can be very time and resource consuming as multiple people are required to help facilitate the transportation of the animal. The large animal lifting and moving apparatus 100 solves this problem allowing a single person to facilitate the movement and lifting of a large animal.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

Unless described differently above, the terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A large animal lifting and moving apparatus comprising:
    a frame having a front end and a rear end, the frame structured to support a large animal between the front end and the rear end and structured to be moved during operation of the large animal lifting and moving apparatus;
    a drive shaft rotatably coupled to the frame;
    a drive motor coupled to the frame and operatively coupled to the drive shaft, the drive motor selectively powered by a power source;
    one or more roller chains coupled to the drive shaft; and
    a cover coupled to the one or more roller chains,
    wherein when the drive motor is powered by the power source, the drive motor drives the drive shaft, the roller chains coupled to the drive shaft, and the cover coupled to the one or more roller chains.

2. The large animal lifting and moving apparatus of claim 1, wherein the power source is a hydraulic fluid source.

3. The large animal lifting and moving apparatus of claim 2, wherein the drive motor includes a hydraulic motor configured to be powered by hydraulic fluid from the hydraulic fluid source.

4. The large animal lifting and moving apparatus of claim 1, wherein the drive motor further includes a worm screw driven by the hydraulic motor.

5. The large animal lifting and moving apparatus of claim 1, wherein the power source is an electrical power source.

6. The large animal lifting and moving apparatus of claim 1, further comprising a strap removably coupled to one or more of the roller chains and structured to removably couple to a large animal, and wherein when the drive motor is powered by the power source, the drive motor drives the drive shaft, the roller chains coupled to the drive shaft, the cover coupled to the roller chains, and the strap removably coupled to one or more of the roller chains.

7. The large animal lifting and moving apparatus of claim 1, wherein the frame further comprises:
    one or more cross bars extending between the front end and the and the rear end;
    an intermediate bar proximate the rear end; and
    a connecting bar proximate the rear end and coupled to the intermediate bar,
    wherein the connecting bar and the intermediate bar define a drive shaft area wherein the drive shaft is positioned.

8. An attachment for outdoor power equipment comprising:
    a frame having a front end and a rear end, the frame including a quick-attach receiver proximate the rear end;
    a drive shaft rotatably coupled to the frame;
    a drive motor coupled to the frame and operatively coupled to the drive shaft, the drive motor selectively powered by the outdoor power equipment;
    one or more roller chains coupled to the drive shaft; and
    a cover coupled to the one or more roller chains,
    wherein when the drive motor is powered by the outdoor power equipment, the drive motor drives the drive shaft, the roller chains coupled to the drive shaft, and the cover coupled to the one or more roller chains.

9. The attachment for outdoor power equipment of claim 8, wherein the drive motor is selectively powered by a hydraulic system of the outdoor power equipment.

10. The attachment for outdoor power equipment of claim 9, wherein the drive motor includes a hydraulic motor configured to be powered by hydraulic fluid from the hydraulic system of the outdoor power equipment.

11. The attachment for outdoor power equipment of claim 10, wherein the drive motor includes a hydraulic fluid inlet removably fluidly coupled to an auxiliary hydraulic output of the outdoor power equipment.

12. The attachment for outdoor power equipment of claim 8, wherein the drive motor is selectively powered by an electrical system of the outdoor power equipment.

13. The attachment for outdoor power equipment of claim 8, wherein the quick-attach receiver is structured to removably couple the frame to a quick-attach assembly of the outdoor power equipment.

14. The attachment for outdoor power equipment of claim 8 further comprising a strap removably coupled to one or more of the roller chains, and wherein when the drive motor is powered by the outdoor power equipment, the drive motor drives the drive shaft, the roller chains coupled to the drive shaft, the cover coupled to the one or more roller chains, and the strap removably coupled to one or more of the roller chains.

15. The attachment for outdoor power equipment of claim 8, wherein the cover further includes a gripping surface.

16. The attachment for outdoor power equipment of claim 8, wherein the drive shaft further includes one or more roller chain sprockets, each roller chain sprocket driving at least one of the roller chains.

* * * * *